United States Patent
Huang

(10) Patent No.: US 12,452,416 B2
(45) Date of Patent: Oct. 21, 2025

(54) GENERATING IMAGE BASED ON PULSE SEQUENCES OBTAINED FROM ENCODED INFORMATION

(71) Applicant: SPIKE VISION (BEIJING) TECHNOLOGY CO., LTD., Beijing (CN)

(72) Inventor: Tiejun Huang, Beijing (CN)

(73) Assignee: SPIKE VISION (BEIJING) TECHNOLOGY CO., LTD., Beijing (CN)

( * ) Notice: Subject to any disclaimer, the term of this patent is extended or adjusted under 35 U.S.C. 154(b) by 150 days.

(21) Appl. No.: 18/371,213

(22) Filed: Sep. 21, 2023

(65) Prior Publication Data

US 2024/0015285 A1 Jan. 11, 2024

Related U.S. Application Data

(63) Continuation-in-part of application No. 17/577,528, filed on Jan. 18, 2022, now Pat. No. 11,800,098, (Continued)

(30) Foreign Application Priority Data

Jan. 22, 2016 (CN) .......................... 201610045011.0
Jan. 11, 2019 (CN) .......................... 201910027914.X
(Continued)

(51) Int. Cl.
*H04N 19/117* (2014.01)
*H04N 19/132* (2014.01)
(Continued)

(52) U.S. Cl.
CPC ......... *H04N 19/117* (2014.11); *H04N 19/132* (2014.11); *H04N 19/167* (2014.11);
(Continued)

(58) Field of Classification Search
CPC .. H04B 10/508; H04B 10/516; H04B 10/524; H04N 1/64; H04N 19/117; H04N 19/132;
(Continued)

(56) References Cited

U.S. PATENT DOCUMENTS

| 5,461,425 A | 10/1995 | Fowler et al. |
| 8,396,153 B1 | 3/2013 | Shen et al. |

(Continued)

FOREIGN PATENT DOCUMENTS

| CN | 1784008 A | 6/2006 |
| CN | 1969559 A | 5/2007 |

(Continued)

OTHER PUBLICATIONS

U.S. Appl. No. 17/577,528, filed Jan. 18, 2022, Pending.
(Continued)

*Primary Examiner* — Xilin Guo
(74) *Attorney, Agent, or Firm* — Leydig, Voit & Mayer, Ltd.

(57) ABSTRACT

A method includes: obtaining, from encoded information, a pulse sequence for each pixel in a plurality of pixels in a unit time period before a specified time, where the encoded information is obtained by encoding respective pulse sequences for the plurality of pixels, wherein the pulse sequence for a given pixel of the plurality of pixels represents a space-time signal change at the given pixel; calculating, for each pixel of the plurality of pixels, a pixel value of the pixel according to the pulse sequence for the pixel; and obtaining an image at the specified time according to a space arrangement of the pixels of the plurality of pixels, in accordance with the pixel values of the plurality of pixels at the specified time.

20 Claims, 5 Drawing Sheets

Related U.S. Application Data which is a continuation of application No. 16/724,906, filed on Dec. 23, 2019, now Pat. No. 11,228,758, which is a continuation-in-part of application No. 16/666,969, filed on Oct. 29, 2019, now Pat. No. 10,937,132, and a continuation-in-part of application No. 16/042,225, filed on Jul. 23, 2018, now Pat. No. 10,523,972, which is a continuation of application No. PCT/CN2017/072038, filed on Jan. 22, 2017.

(30) Foreign Application Priority Data

Dec. 15, 2022 (CN) .......................... 202211620181.9
Dec. 15, 2022 (CN) .......................... 202211620656.4

(51) Int. Cl.
H04N 19/167 (2014.01)
H04N 19/182 (2014.01)
H04N 19/33 (2014.01)
H04N 19/60 (2014.01)

(52) U.S. Cl.
CPC ........... *H04N 19/182* (2014.11); *H04N 19/33* (2014.11); *H04N 19/60* (2014.11)

(58) Field of Classification Search
CPC .... H04N 19/167; H04N 19/182; H04N 19/33; H04N 19/60; H04N 5/926
See application file for complete search history.

(56) References Cited

U.S. PATENT DOCUMENTS

| | | | |
|---|---|---|---|
| 10,607,339 | B2 | 3/2020 | Shiroishi et al. |
| 2002/0047818 | A1 | 4/2002 | Yamamoto et al. |
| 2003/0001080 | A1 | 1/2003 | Kummaraguntla et al. |
| 2004/0046882 | A1 | 3/2004 | Nakano et al. |
| 2004/0136439 | A1 | 7/2004 | Dewberry et al. |
| 2005/0073451 | A1 | 4/2005 | Bocko et al. |
| 2006/0022982 | A1 | 2/2006 | Sekigawa |
| 2007/0223367 | A1 | 9/2007 | Wu et al. |
| 2008/0217546 | A1 | 9/2008 | Steadman et al. |
| 2010/0202502 | A1 | 8/2010 | Tong et al. |
| 2011/0235698 | A1 | 9/2011 | Petre et al. |
| 2012/0187948 | A1* | 7/2012 | Yamashita ......... G01R 33/5659 324/318 |
| 2012/0307928 | A1 | 12/2012 | Jia et al. |
| 2015/0022210 | A1 | 1/2015 | Yokosawa et al. |
| 2015/0276903 | A1* | 10/2015 | Taniguchi .......... G01R 33/5614 324/318 |
| 2015/0276905 | A1* | 10/2015 | Murase ............ G01R 33/56563 324/322 |
| 2016/0048986 | A1* | 2/2016 | Park ...................... G06T 11/206 345/440 |
| 2016/0356871 | A1* | 12/2016 | Grodzki ................. G01R 33/50 |
| 2017/0162107 | A1 | 6/2017 | Ninan et al. |
| 2017/0209067 | A1 | 7/2017 | Taniguchi et al. |
| 2020/0128245 | A1 | 4/2020 | Huang |
| 2020/0200923 | A1 | 6/2020 | Nishiha et al. |
| 2020/0309955 | A1 | 10/2020 | Laflaquiere et al. |
| 2022/0271846 | A1 | 8/2022 | Bucklew et al. |

FOREIGN PATENT DOCUMENTS

| | | |
|---|---|---|
| CN | 101738380 A | 6/2010 |
| CN | 102006397 A | 4/2011 |
| CN | 104113754 A | 10/2014 |
| CN | 104952470 A | 9/2015 |
| CN | 105681787 A | 6/2016 |
| CN | 105721783 A | 6/2016 |
| CN | 106845541 A | 6/2017 |
| CN | 107333040 A | 11/2017 |
| CN | 108881906 A | 11/2018 |
| CN | 109039980 A | 12/2018 |
| CN | 109102000 A | 12/2018 |
| CN | 114503027 A | 5/2022 |
| CN | 115169387 A | 10/2022 |
| JP | S6343465 A | 2/1988 |
| JP | H10269345 A | 10/1998 |
| JP | 2007532025 A | 11/2007 |
| JP | 2008527344 A | 7/2008 |
| JP | 2009141745 A | 6/2009 |
| JP | 5029608 B2 | 9/2012 |
| JP | 5116619 B2 | 1/2013 |
| JP | 2013150745 A | 8/2013 |
| JP | 2013211771 A | 10/2013 |
| JP | 2015109629 A | 6/2015 |
| WO | 2004032402 A1 | 4/2004 |
| WO | 2006072847 A1 | 7/2006 |
| WO | 2022184167 A1 | 9/2022 |

OTHER PUBLICATIONS

U.S. Appl. No. 16/724,906, filed Dec. 23, 2019, Patented.
U.S. Appl. No. 16/666,969, filed Oct. 29, 2019, Patented.
U.S. Appl. No. 16/042,225, filed Jul. 23, 2018, Patented.
Dong et al., "Spike Camera and Its Coding Methods," 2017 Data Compression Conference (DCC), Snowbird, UT, USA, dated Apr. 7, 2017.
Extended European Search Report issued in counterpart European Patent Application No. 17741117.0, dated Oct. 26, 2018.
First Office Action issued in counterpart Chinese Patent Application No. 201910027914.X, dated Nov. 25, 2019.
Gu et al., "A New Approach for Noise Reducing of Image Based on PCNN," Journal of Electronics and Information Technology, vol. 24, No. 10, pp. 1304-1309, dated Oct. 31, 2002.
International Search Report issued in corresponding PCT Application No. PCT/CN2017/072038, dated Apr. 26, 2017.
Lazar et al., "Video Time Encoding Machines," IEEE Transactions on Neural Networks, vol. 22, No. 3, pp. 461-473, dated Mar. 31, 2011.
Notice of Reasons for Refusal issued in counterpart Japanese Patent Application No. 2018-538118, dated Jul. 3, 2019.
Notice of Reasons for Refusal issued in counterpart Japanese Patent Application No. 2020-088332, dated Jul. 27, 2021.
Notification of Reason for Refusal issued in counterpart Korean Patent Application No. 10-2018-7022875, dated Dec. 15, 2020.
Pelayo et al., "Retina-like processing and coding platform for cortical neuro-stimulation," Proceedings of the 25th Annual International Conference of the IEEE EMBS, Cancun, Mexico, pp. 2023-2026, dated Sep. 21, 2003.
Rajan et al., "Image Enhancement Using Integer Sequences," 2009 IEEE 13th Digital Signal Processing Workshop and 5th IEEE Signal Processing Education Workshop, Marco Island, FL, USA, pp. 685-689, dated Jan. 7, 2009.
Wang, "Space-Time Coding MIMO-OFDM SAR for High-Resolution Imaging," IEEE Transactions on Geoscience and Remote Sensing, vol. 49, No. 8, pp. 3094-3104, dated Aug. 31, 2011.
Written Opinion issued in corresponding PCT Application No. PCT/CN2017/072038, dated Apr. 26, 2017.
European Patent Office, Munich Germany, Application No. 17741117.0-1208 PCT/CN2017/072038, Peking University, Oct. 16, 2018.
Hu et al., "Optical Flow Estimation for Spiking Camera," 2022 IEEE/CVF Conference on Computer Vision and Pattern Recognition (CVPR) pp. 17844-17853 (Jun. 18-24, 2022).
Xikui et al., "Research of laser encoding method based on time-controlled pulse interval," Infrared and Laser Engineering, vol. 45, No. 10 (Oct. 2016).
Tiejun et al., "Advances in spike vision," Journal of Image and Graphics, vol. 27, No. 6, pp. 1823-1839 (Jun. 2022).

\* cited by examiner

GENERATING IMAGE BASED ON PULSE SEQUENCES OBTAINED FROM ENCODED INFORMATION

CROSS-REFERENCE TO RELATED APPLICATIONS

The present application is a continuation-in-part of U.S. application Ser. No. 17/577,528, filed on Jan. 18, 2022. The present application also claims priorities to Chinese Patent Application No. 202211620656.4, filed on Dec. 15, 2022, and to Chinese Patent Application No. 202211620181.9, filed on Dec. 15, 2022. The U.S. application Ser. No. 17/577,528 is a continuation of U.S. application Ser. No. 16/724,906, filed on Dec. 23, 2019. The U.S. application Ser. No. 16/724,906 is a continuation-in-part of U.S. application Ser. No. 16/042,225, filed on Jul. 23, 2018, which is a continuation of International Patent Application No. PCT/CN2017/072038, filed on Jan. 22, 2017, which claims priority to Chinese Patent Application No. 201610045011.0, filed on Jan. 22, 2016. The U.S. application Ser. No. 16/724,906 is also a continuation-in-part of U.S. application Ser. No. 16/666,969, filed on Oct. 29, 2019, which claims priority to Chinese Patent Application No. 201910027914.X, filed on Jan. 11, 2019. The U.S. application Ser. No. 16/724,906 also claims priority to Chinese Patent Application No. 201910027914.X, filed on Jan. 11, 2019. All contents of all of the aforementioned applications are incorporated by reference herein.

TECHNICAL FIELD

The present disclosure relates to the field of information coding technology, particularly to an imaging method, device and medium.

BACKGROUND

The form that exists in a certain time and space is a source of information, for example, the propagation of light in space forms dynamic images, the flow of large numbers of water molecules produces ocean information, and the dynamic movement of air molecules and other floats forms climate information. In terms of dynamic images, humans and creatures perceive the world by capturing photons through their eyes, and the modern camera records the dynamically changing world by using CCD (Charge-coupled Device) or CMOS (Complementary Metal Oxide Semiconductor) to capture photons, which generates large amounts of image and video data.

Traditional methods of representing dynamic images are two-dimensional images and videos as sequences of images. The traditional image is a two-dimensional information form. The narrowly defined image is the result that light is projected on a photographic plane after reflection, diffuse reflection, refraction or scattering in the physical world. The generalized image includes any information form distributed on a two-dimensional plane. The image represented by the digital form is more convenient to process, transmit and store, so it is necessary to transform an image in the analog signal form into an image represented by the digital form, i.e., a digital image. The process of image digitization mainly includes three steps: sampling, quantization and coding. Sampling is a process of discretizing the space distribution of an image. For a two-dimensional image, the most common way is to divide a rectangular area covered by the image into equal-sized sampling points at equal intervals, and the number of rows of sampling points and the number of sampling points per row are usually called digital image resolution (more accurate resolution refers to the number of sampling points per unit physical size). Quantization is a process of discretizing the color (or other physical quantities) of an image at each sampling point, which is generally represented by a quantization level. The quantized values of each sampling point and its color (or other physical quantities) form one pixel of the image, and all pixels arranged in rows or columns form a digital image.

The traditional concept of video is a sequence of images obtained at a certain time interval. An image in the sequence is also called a frame image. Therefore, a video is also an image sequence. The time interval division between images is also a part of sampling. Usually, equal interval division is adopted, and the number of images collected per second is called frame rate. In order to ensure that the information is not lost in the process of digitalization, that is, complete restoration can be achieved when the information is restored to the analog form, according to the sampling theorem, it needs to be sampled at least twice the frequency of the image spatial signal.

The video collected in the traditional way produces a large amount of data after the digitalization. Taking a high-definition video as an example, the amount of data per second is 1920×080×24 bits×30 frames per second=1492992000 bits per second, which is about 1.5 Gbps. It is almost impossible for network and storage technology to transmit such amount of data through a broadcast communication network, or to provide video services for thousands of users on the internet, or to store video data generated by millions of cameras in cities for 24 hours. A large amount of redundancy needs to be removed in high-precision digital video data, which is the central goal of digital video coding, so digital video coding is also called digital video compression. From the research of Hoffman coding and differential pulse coding modulation in the late 1840s and early 1850s, video coding technology has experienced the development for nearly 60 years. In this process, three types of classical techniques including transform coding, prediction coding and entropy coding were generally formed to remove spatial redundancy, temporal redundancy and information entropy redundancy of video signals respectively.

Based on the requirement of technology accumulation and information technology development for more than 30 years, various video coding technologies began to converge in the 1980s, and gradually formed a block-based hybrid coding framework of prediction and transformation. The hybrid coding framework was standardized by the standardization organization, and began to be applied on a large scale in the industry. There are two major international organizations specializing in the formulation of video coding standards in the world, namely the MPEG (Motion Picture Experts Group) organization under the ISO/IEC and the VCEG (Video Coding Experts Group) organization of the ITU-T. The MPEG founded in 1986 is specifically responsible for the developing of related standards in the multimedia field, which is mainly used in storage, broadcast television, streaming media on the Internet or wireless network and so on. ITU, the International Telecommunication Union, mainly formulates video coding standards for the field of real-time video communications, such as video telephony, video conference and other applications. The AVS working group, set up by China in June 2002, is responsible for formulating corresponding digital audio and video coding standards for the domestic multimedia industry.

In 1992, the MPEG organization formulated the MPEG-1 standard (launched in 1988, was a superset of ITU H.261) for VCD (Video Compact Disk) application with a data rate of about 1.5 Mbps; in 1994, the MPEG-2 standard (launched in 1990) for applications such as DVD and digital video broadcasting was released, which is applicable to bit rates of 1.5-60 Mbps or even higher; in 1998, the MPEG formulated the MPEG-4 standard (launched in 1993, based on the MPEG-2 and 1-1.263) for low bit rate transmission. ITU, basically kept pace with the development of the MPEG, and also formulated a series of H.26x standards. The H.261 standard, which began in 1984, was a precursor to the MPEG-1 standard and was basically completed in 1989, mainly formulated for realizing videophone and video conference on ISDN. On the basis of H.261, the ITU-T formulated the H.263 coding standard (launched in 1992) in 1996, and successively introduced H.263+, H.263++, etc.

In 2001, the ITU-T and the MPEG jointly established the JVT (Joint Video Team) working group, and set up a new video coding standard. The first edition was completed in 2003. The standard was called the tenth part of the MPEG-4 standard (MPEG-4 PartAVC) in the ISO, and called the H.264 standard in the ITU. Four months later, the Microsoft-led VC-1 video coding standard was promulgated as an industry standard by the Society of Motion Picture and Television Engineers (SMPTE) of America. In 2004, a national standard with independent intellectual property rights was developed in China, and it was promulgated as a national standard of "Information Technology Advanced Audio and Video Coding Part II Video" (National label GB/T 20090.2-2006, usually referred to as the AVS video coding standard for short) in February 2006, after industrialization verification such as chip implementation. These three standards are usually referred to as the second generation video coding standard, and their coding efficiency is double that of the first generation, and the compression ratio is up to about 150 times, that is, a high-definition video (under the condition that the quality meets the broadcast requirements) may be compressed to 10 Mbps or less.

In the first half of 2013, ITU-T H.265 and ISO/IEC HEVC (High Efficiency Video Coding) as the third generation video coding international standard were promulgated, and the coding efficiency was doubled that of H.264. In parallel with this, China formulated the second generation AVS standard AVS2, which is called "Information Technology Efficient Multimedia Coding". Compared with the first generation AVS standard, the bitrate of AVS2 is reduced by more than 50%, which means that the coding efficiency is doubled. For a scene-like video such as a monitoring video, the compression efficiency of AVS2 is further doubled, and up to four times that of AVC/H.264, that is, the compression efficiency has reached 600 times.

Although modern video coding technology has already achieved remarkable results and has been widely applied, and the compression efficiency has realized "doubling every ten years", it is far from reaching an ideal level. According to the existing research report, the global data volume reached 2.84 ZB in 2012. By 2020 the figure will rise to 40 ZB, which will double about every two years, of which the monitoring video will account for 44%. In other data such as health data, transaction data, network media, video entertainment data, etc., the image and the video will also account for a large proportion. In China, more than 30 million cameras have been installed in public places, and these cameras have produced nearly 100 EB video which requires hundreds of billions of yuan in storage. Therefore, the technological progress of "doubling every ten years" in video coding efficiency has been far from satisfying the rapid growth of "doubling every two years" in video big data, and how to improve the video coding efficiency has become a major challenge in the information age.

As mentioned above, the formation of video concept originates from the disclosure of film, and the basis for the technique scheme of representing a video with an image sequence is visual persistence phenomenon of human vision. The film uses 24 frames per second and the television uses 25 or 30 frames per second, which can basically meet the needs of human eyes to get a continuous sense. This technical setting is also solidified as a technical formula with the wide application of film, television and personal camera equipment. However, the disadvantages of this method of representing dynamic images are also obvious. It can't record high-speed movements such as a rotating wheel, a high-speed sport table tennis or even soccer. It also fails to catch the movement details in video monitoring, and it can't support scientific research, high-precision detection and other special requirements. New high-definition and ultra-high definition televisions are also trying to increase the frame rate to 60 frames per second or even higher to better represent high-speed sports such as table tennis. However, such a video frame rate can't represent a faster changing physical phenomenon, so high frequency cameras appear. Their frame rate can reach 1000 frames per second, even 10.000 frames or higher. The problem is the large-scale growth of data volume, and the corresponding acquisition and processing circuit design are expensive or even impossible. More importantly, the increase in the frame rate means exposure time of a single frame is reduced, and the exposure of the collected single frame image is seriously insufficient. A way to compensate this is to increase pixel size, which brings about the reduction of spatial resolution. In the final analysis, all of these problems are caused by video acquisition and representation using "first space, after time" equal time interval method. This method is only a technological choice based on the persistence characteristics of human vision when the film appears, does not mean it is the best solution to represent dynamic images.

Therefore, it is an urgent problem to develop an effective video coding method that takes account of temporal information and spatial information simultaneously.

Machine vision algorithms based on traditional image sensors have been widely used in many fields such as intelligent safeguard and intelligent transportation. However, the traditional image sensors become increasingly incapable of meeting current visual mission requirements due to design concepts thereof. These sensors generally perform a complete sampling on a scenario at a preset fixed frequency and in a unit of frame. Such sampling based on fixed frame rate cannot reflect a dynamic change of the scenario, and is prone to an oversampling or undersampling on the current scenario, thereby causing problems such as a large redundancy of video data, a low time domain resolution, and blurring under high speed motion. Inspired by a visual sampling mechanism of biological retina, new types of cameras that collect pulse array signals are developed, including sensors that fire pulse signals based on a change in illumination intensity, such as Dynamic Vision Sensor (DVS), Asynchronous Time-based Image Sensor (ATIS) and Dynamic and Active Pixel Vision Sensor (DAVIS), and sensors that fire signals based on accumulative illumination intensity, such as illumination intensity accumulation sensors. Sensors of such type of cameras collecting information of optical signals in a certain region during a certain period of time, and have advantages of high dynamic range, high time resolution, and the like.

Transforming signals into human-viewable display forms is the first step in intuitively understanding pulse signals. Since most of the existing machine learning algorithms cannot directly process pulse signals as data sources, it is desired to provide a technology capable of visualizing pulse signals. However, in implementing high-speed and real-time output by a pulse vision model, a bitrate generally fluctuates as a light intensity changes, making it complex to management and difficult to implement high-speed and real-time transmission. In addition, the corresponding pulse sampling frequency is usually as high as one million Hertz, and the output bit rate of the camera is also huge, which is difficult for ordinary camera systems to withstand.

SUMMARY

According to one aspect of the present disclosure, a method is provided, including: obtaining, from encoded information, a pulse sequence for each pixel in a plurality of pixels in a unit time period before a specified time, where the encoded information is obtained by encoding respective pulse sequences for the plurality of pixels, wherein the pulse sequence for a given pixel of the plurality of pixels represents a space-time signal change at the given pixel; calculating, for each pixel of the plurality of pixels, a pixel value of the pixel according to the pulse sequence for the pixel; and obtaining an image at the specified time according to a space arrangement of the pixels of the plurality of pixels, in accordance with the pixel values of the plurality of pixels at the specified time.

According to another aspect of the present disclosure, a computing device is provided, including: at least one processor; and at least one memory having instructions stored thereon, where the instructions, when executed by the at least one processor individually or collectively, cause the at least one processor of the computing device to perform at least the operations including: obtaining, from encoded information, a pulse sequence for each pixel in a plurality of pixels in a unit time period before a specified time, where the encoded information is obtained by encoding respective pulse sequences for the plurality of pixels, wherein the pulse sequence for a given pixel of the plurality of pixels represents a space-time signal change at the given pixel; calculating, for each pixel of the plurality of pixels, a pixel value of the pixel according to the pulse sequence for the pixel; and obtaining an image at the specified time according to a space arrangement of the pixels of the plurality of pixels, in accordance with the pixel values of the plurality of pixels at the specified time.

According to yet another aspect of the present disclosure, a non-transitory computer-readable medium including instructions is provided, where the instructions, when executed by at least one processor of a computing device individually or collectively, cause the computing device to perform operations including: obtaining, from encoded information, a pulse sequence for each pixel in a plurality of pixels in a unit time period before a specified time, where the encoded information is obtained by encoding respective pulse sequences for the plurality of pixels, wherein the pulse sequence for a given pixel of the plurality of pixels represents a space-time signal change at the given pixel; calculating, for each pixel of the plurality of pixels, a pixel value of the pixel according to the pulse sequence for the pixel; and obtaining an image at the specified time according to a space arrangement of the pixels of the plurality of pixels, in accordance with the pixel values of the plurality of pixels at the specified time.

The additional aspects and advantages of the present disclosure will be partly given in the following description which will be obvious from the following description or be understood through the practice of the present disclosure.

BRIEF DESCRIPTION OF DRAWINGS

In order to clearly illustrate technical solutions of embodiments of the present disclosure, the drawings used in the description of the embodiments will be briefly described below. Obviously, the drawings in the following descriptions are just some embodiments of the present disclosure. For those of ordinary skill in the art, other drawings also can be obtained according to these drawings without any creative work.

DETAILED DESCRIPTION

Figure 1:
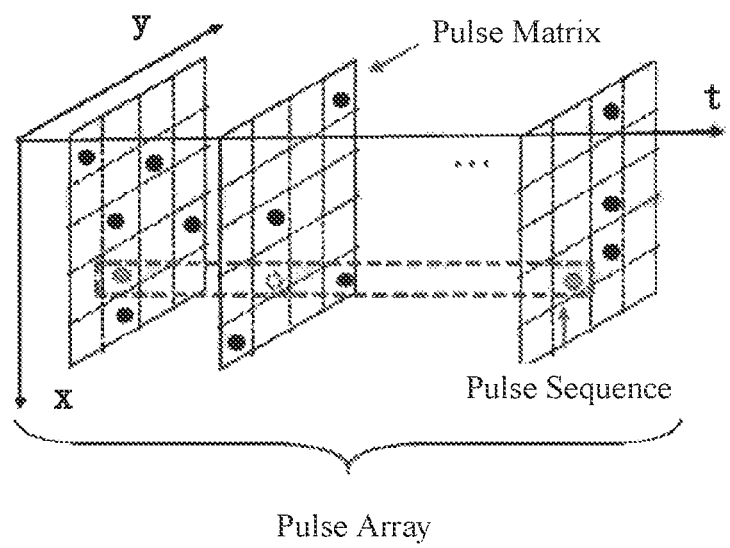
FIG. 1 is an example diagram of pixels and a pulse sequence of an imaging method according to an embodiment of the present disclosure.

Various example embodiments of the present disclosure will now be described in detail with reference to the accompanying drawings. It should be noted that unless otherwise specifically stated, relative arrangements of the components and steps, numerical expressions, and values described in these embodiments constitute no limitation on the scope of the present disclosure.

Those skilled in the art may understand that the terms "first" and "second" in the embodiments of the present disclosure are only used to distinguish between different steps, devices, or modules, etc., and represent neither any specific technical meaning nor a definite logic sequence therebetween.

It is also understood that in the embodiments of the present disclosure, "a plurality" may mean two or more, and "at least one" may mean one, and two or more.

It should be further understood that any component, data, or structure mentioned in the embodiments of the present disclosure may be generally understood as one or more if it is not explicitly defined or given the opposite enlightenment in the context.

In addition, the term "and/or", as used in the present disclosure, is merely an association for describing associated objects, indicating that three relationships may exist, for example, A and/or B, which may indicate that: only A exists, both A and B exist, and only B exists. In addition, the character "/" in the present disclosure generally indicates an "or" relationship between the associated objects.

It should be further understood that the description of the embodiments in the present disclosure emphasizes the differences between the embodiments, and for the same or similar parts, reference can be made to each other. For brevity, details are not repeatedly described herein.

In addition, it should be understood that, for ease of description, the dimensions of the various parts shown in the accompanying drawings are not drawn according to the actual proportional relationship.

The following description of at least one example embodiment is merely illustrative in nature and is in no way intended to limit the present disclosure and application or use thereof.

Technologies, methods and devices known to those of ordinary skill in the related art may not be discussed in detail, but should be considered as part of the specification where appropriate.

It should be noted that similar reference signs and letters refer to similar items in the following drawings. Therefore, once a specific item is defined in one of the drawings, it need not be further discussed in subsequent drawings.

The embodiments of the present disclosure may be applicable to electronic devices such as camera devices, terminal devices, computer systems, and servers, which may operate with numerous other general-purpose or special-purpose computing system environments or configurations. Examples of well-known terminal devices, computing systems environments or configurations suitable for use with electronic devices such as terminal devices, computer systems, and servers include, but are not limited to: a computer system, a server computer system, a thin client, a fat client, a handheld or laptop device, a microprocessor-based system, a set top box, a programmable consumer electronics, a networked computer, a small or large computer system, and a distributed cloud computing technology environment including any of the above systems, etc.

The electronic devices such as terminal devices, computer systems, and servers may be described in the general context of computer system executable instructions (such as a program module) executed by the computer system. Generally, a program module may include a routine, a program, a target program, a module, logic, a data structure, etc., which perform specific tasks or implement specific abstract data types. A computer system/server may be implemented in a distributed cloud computing environment where tasks are performed by remote processing devices that are linked through a communication network. In the distributed cloud computing environment, the program module may be located on a local or remote computing system storage medium including a storage device.

Each imaging element of a CMOS sensor is an independent photodetector which can independently record a high-speed change process of light. By means of pulse modulation, an imaging element starts to accumulate charges from an empty state, generates a simplest pulse when a voltage difference reaches a specified threshold, and automatically resets and restarts to accumulate charges. A time interval between two pulses is an accumulated duration of the latter pulse, which is called a pulse width. As such, each imaging element converts the received ultra-high-speed photon stream into an ultra-high-speed spiking stream. The spiking stream refers to a pulse sequence formed by pulses on a time axis and is a digital representation of a photocurrent process. The pulse sequences generated by imaging elements form a pulse sequence array by spatially arranging the imaging elements, i.e., digital representation of an incident light stream on an image plane, and visual information representation that is closer to a photophysical process than images and videos, which is called a pulse vision model (SVM), and a camera working in this way is called a pulse camera. The pulse camera allows for continuous recording and representation of the light process: from the pulse sequence generated by the quantitative accumulation of each imaging element, the light intensity at any instant can be estimated so as to obtain an image at any instant, i.e., implementing continuous imaging.

The pulse camera naturally has a high time sensitivity, and a shorter pulse width indicates a stronger ability to represent a high-speed motion process. The pulse camera has a time sensitivity of tip to 0.1 us to strong light, i.e., an ability of sensing ten million Hertz, and does not have a high time sensitivity to weak light, but it can still distinguish between the intensities of different types of weak light depending on accumulation times. The SVM represents a photon/electron stream in the form of a pulse sequence. However, such a high-frequency representation capability of the pulse sequence requires an extremely high data rate, which imposes great pressure on data storage and transmission.

In order to take advantage of the high-frequency representation capability of the pulse sequence while reducing the pressure on storage and transmission, the pulse signal is encoded to lower the requirement for the data rate, improve the reliability of transmission, and facilitate subsequent data storage and data transmission. In the encoding process, the pulse sequence is sampled at a sampling frequency to obtain pulse eigenvalues corresponding to respective sampling instants. In a single-bit synchronization encoding mode, a pulse eigenvalue corresponding to each sampling instant in a unit time period is encoded to obtain the encoded information corresponding to the unit time period. In a multi-bit synchronization encoding mode, data to be encoded in a unit time period is determined based on a current encoding mode and the pulse eigenvalues corresponding to respective sampling instants in the unit time period, and the data to be encoded in the unit time period is encoded based on the current encoding mode, to obtain the encoded information corresponding to the unit time period. The encoded information obtained by encoding the pulse sequence may be used for local storage and remote transmission.

Based on the encoded information obtained through encoding, a pulse sequence for each pixel is obtained therefrom, and a pixel value of the pixel is calculated based on the pulse sequence for the pixel. Based on the calculated pixel value of each pixel and a spatial arrangement of pixels, an image is generated and displayed. Generating an image based on the encoded information enables fine reconstruction of a high dynamic image while allowing for compression of the data rate.

FIG. 1 is an example diagram of pixels and a pulse sequence according to an embodiment of the present disclosure. As shown in FIG. 1, x and y are two coordinate axes of a pixel coordinate system, and t is a time coordinate axis. A pulse camera represents visual information in the form of an H*W*T pulse array, where M*W is a spatial resolution of the pulse camera, and T is a number of times the pulse camera performs sampling. A pulse signal sequence corresponding to each spatial region is a pulse sequence, the pulse sequences corresponding to all spatial regions are arranged according to the spatial position relationship of the spatial regions, forming a pulse array, and a cross section of the pulse array at an instant is a pulse matrix. The pulse array is formed by two symbols of 1 and 0, where 1 (a solid point in FIG. 1) indicates that a pulse signal is generated at an imaging element (corresponding to one spatial region) at the sampling instant, and the imaging element corresponds to a pixel in an image; and 0 indicates that no pulse signal is generated at the imaging element. The pulse camera can be used to record changes in instantaneous light intensity values of imaging elements without a concept of frame rate or exposure time, which breaks through limitations of conventional cameras.

Figure 2:
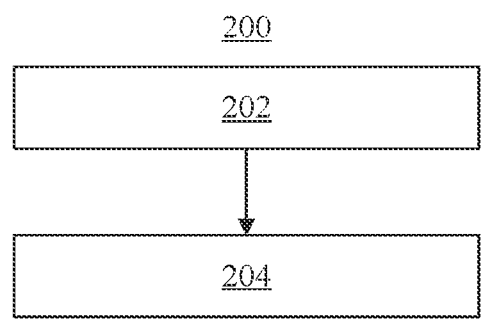
FIG. 2 is a flowchart of an encoding method for a pulse signal according to an embodiment of the present disclosure.

FIG. 2 is a flowchart of an encoding method (single-bit synchronization encoding mode) 200 for a pulse signal according to an embodiment of the present disclosure. The pulse sequence for the given pixel includes a pulse eigenvalue indicating whether a respective pulse signal is generated for the given pixel at each instant. As shown in FIG. 2, encoding respective pulse sequences for the plurality of pixels includes the steps as follows.

For any pulse sequence of the respective pulse sequences:

In 202: in response to an end of each unit time period, the pulse sequence in the unit time period is sampled at a sampling frequency to obtain pulse eigenvalues corresponding to respective sampling instants in the unit time period.

In 204: the pulse eigenvalues corresponding to respective sampling instants in the unit time period is encoded, to obtain the encoded information corresponding to the unit time period.

The pulse sequence for the given pixel includes a pulse eigenvalue indicating whether a respective pulse signal is generated for the given pixel at each instant.

In the embodiments of the present disclosure, the pulse sequence is a spiking stream or a pulse signal stream, and the pulse eigenvalue is used to indicate whether a pulse signal is generated. Two preset values may be used to respectively indicate whether a pulse signal is generated and not generated. For example, in some implementations, binary symbols of 1 and 0 may be used as pulse eigenvalues to respectively indicate that a pulse signal is generated and not generated at a corresponding instant.

Based on this embodiment, continuous recording and digital representation of a light process may be implemented by means of encoding the pulse eigenvalues in a time unit corresponding to respective sampling instants in a unit time. Based on the encoded information of the pulse signals in the unit time, the light intensity at any instant can be estimated to obtain an image at any instant, thereby implementing continuous imaging, exhibiting a high time sensitivity, a high-frequency representation capability, and an ultrastrong representation capability for a high-speed motion process, enabling effective recording of a high-speed motion, such as a rotating wheel, a high-speed moving table tennis ball or even a football, capturing motion details in an observation scenario, and thus supporting special needs such as scientific research and high-precision detection.

In some embodiments, optical signals in a spatial region can be collected and accumulated to obtain a signal accumulation amount. In response to the signal accumulation amount reaching a preset threshold, a pulse signal is generated, and the signal accumulation amount may be further reset (e.g., to 0) to re-accumulate optical signals in the spatial region.

In the embodiments of the present disclosure, the optical signals in the spatial region may be collected by a signal collector, such as by a photosensitive device in a camera, or an imaging element of a CMOS sensor. The optical signals collected by the signal collector may, for example, include, but are not limited to, laser, infrared light, or visible light. That is, in the embodiments of the present disclosure, each signal collector in a plurality of signal collectors may be respectively used to collect and accumulate optical signals in each spatial region in the observation scenario for subsequent processing.

Each signal collector may perform time-domain sampling on optical signals in a specified spatial region position in the observation scenario. In a collector array formed by arranging the plurality of signal collectors, each signal collector collects optical signals in one spatial region in the observation scenario, and spatial regions corresponding to different signal collectors do not overlap. The signal collectors in the collector array cooperate with each other to cover the area of the whole observation scenario, so that the optical signals in the whole observation scenario can be sampled. The pulse sequences corresponding to all the spatial regions in the observation scenario are arranged according to a spatial position relationship of the spatial regions, to form a pulse array. The embodiment shown above in FIG. 2 is a processing process for the optical signals in the spatial regions that are collected by the signal collectors. The optical signals in the spatial region that are collected by the signal collectors in the collector array are respectively processed independently according to the flow of the embodiment shown above in FIG. 2, and therefore, the optical signals in the whole observation scenario can be processed to obtain the encoded information of pulse signals corresponding to the area of the whole observation scenario. The observation scenario in the embodiments of the present disclosure refers to a scenario for which visual information needs to be recorded, for example, a traffic intersection including traffic lights, a scenario including a rotating wheel, a scenario including a high-speed moving object, etc.

In some embodiments, each signal collector may be used to convert an instantaneous light intensity value of each collected optical signal into an electrical signal (e.g., a current signal, a voltage signal, etc.) positively correlated to the instantaneous light intensity value, where a signal intensity value of the electrical signal is positively correlated to the collected light intensity value. Then, the signal intensity value of the electrical signal is transferred to a connected signal accumulator. Next, the signal accumulator accumulates received signal intensity values to obtain a signal accumulation amount, and then transfers the signal accumulation amount to a connected filter. The signal collector functions to implement collection and photoelectric conversion of optical signals, i.e., to collect optical signals and convert the collected optical signals into electrical signals (e.g., current signals, voltage signals, etc.). In the embodiments of the present disclosure, an electrical signal has a signal intensity, and accordingly, accumulating the optical signals in the spatial region is equivalent to accumulating signal intensities of corresponding electrical signals, and the obtained signal accumulation amount represents the accumulated signal intensity.

Accordingly, the received signal accumulation amount may be filtered by the filter based on a preset threshold. In response to the signal accumulation amount reaching the preset threshold, the filter generates a pulse signal and resets the signal accumulation amount in the connected signal accumulator.

The signal collector is a high-sensitivity photosensitive device, the signal accumulator is a high-sensitivity conversion device, and a combination of the two can provide an accurate measurement of the number of collected photons. The pulse sequence output by the filter represents the number of photons irradiated in the corresponding spatial region.

In some embodiments, the sampling frequency in operation 202 is $2^k$ Hertz, where k is an integer greater than or equal to 0. In this case, in response to an end of one unit time, the pulse sequences in the unit time are sampled at the sampling frequency of $2^k$ Hertz to obtain pulse eigenvalues in a $\frac{1}{2^k}$ time unit corresponding to respective sampling instants in the unit time, where the pulse eigenvalue in the $\frac{1}{2^k}$ time unit is an identifier used for representing whether there is a pulse signal in the $\frac{1}{2^k}$ time unit, and may be 0 or 1, with 0 indicating that no pulse signal is generated in the $\frac{1}{2^k}$ time unit and 1 indicating that a pulse signal is generated in the $\frac{1}{2^k}$ time unit.

For example, in a specific example, if it is assumed that k=2 and the unit time above is 1 second (s), a duration of the $\frac{1}{2^k}$ time unit corresponding to each sampling instant is 0.25 s, i.e., 250 ms. Within the durations of 250 ms corresponding to sampling instants in the last 1 s: a pulse is generated, a pulse is generated, no pulse is generated, and a pulse is generated, and then the pulse eigenvalues in the durations of 250 ms corresponding to sampling instants in the last 1 s, which are obtained through operation 202, are respectively 1101.

Accordingly, in some possible implementations, in operation 204, the pulse eigenvalue in the time unit corresponding to each sampling instant in the unit time can be encoded into $2^k$ bits of data, i.e., the pulse eigenvalue in the time unit corresponding to each sampling instant in the unit time is represented as the data of $2^k$ bits in the form of code (e.g., binary), to obtain the encoded information of the pulse signals in the unit time. The specific encoding mode and the specific form of the encoded information are not limited in the embodiments of the present disclosure.

Continuing with the example above, when k=2, the pulse eigenvalues in the durations of 250 ms corresponding to sampling instants in the last 1 s, which are obtained through operation 202, are respectively 1101, and then the pulse eigenvalues 1101 in the last 1 s are encoded separately, i.e., the pulse eigenvalues 1101 are represented in the form of code (e.g., binary), and the encoded information of 2 bits obtained through encoding can be represented as 1101, for example, in a binary form.

In the embodiments of the present disclosure, a high-speed sampling frequency of $2^k$ Hertz is used for recording the presence (or not) of a pulse within a $\frac{1}{2^k}$ time unit for each sampling, and encoding the pulse. Such an encoding mode may be referred to as single-bit synchronization encoding, and the corresponding pulse vision model may also be referred to as a single-bit synchronization pulse model.

In conventional single-bit oversampling, a signal collector is required to determine, within each sampling period, whether a signal accumulation amount exceeds a quantization differential (i.e., the above preset threshold) q, and obtains 1 if the signal accumulation amount exceeds the quantization differential, and 0 otherwise. In practice, however, the accumulated intensity of the signal accumulation amount in $2^k$ sampling periods is lower than $2^k$ q in most cases, i.e., the accumulated intensity of the signal accumulation amount within a single sampling period (corresponding to the above time unit) is lower than the quantization differential q, in which case a large number of 0 are collected, failing to implement effective collection. However, with the single-bit synchronization pulse model of the embodiments of the present disclosure, the signal accumulation amount may span a plurality of sampling periods, and 1 is generated only when the signal accumulation amount reaches the quantization differential q, such that weak signals can be effectively collected without improving the signal collector circuit, or even possibly lowering actual requirements. Therefore, the single-bit synchronization pulse model of the embodiments of the present disclosure triggers turnover and outputs 1 once only when the signal accumulation amount reaches the preset threshold, thereby enabling a reduction in circuit complexity and corresponding power consumption, as compared to the single-bit oversampling which requires comparison and outputs 0 or 1 in each sampling.

In some embodiments, the bitrate of the encoded information of the pulse signals in the unit time may also be estimated based on the encoded information of the pulse signals in the unit time for each spatial region. Similarly, the bitrate of the encoded information of the pulse signals in the unit time corresponding to the observation scenario may be estimated based on the encoded information of the pulse signals in the unit time corresponding to all the spatial regions in the observation scenario.

The bitrate, i.e., bit rate, is the number of data bits (i.e., the number of bits) transmitted in unit time during transmission of encoded information, in a unit of bits per second (bit/s or bps), kilo-bits per second (kbit/s or kbps), or megabits per second (Mbps). A higher bitrate indicates a greater amount of data transmitted in a unit time, and thus a better effect of recording and representing visual information. However, a greater volume of data of encoded information of the pulse signals in the unit time indicates a higher corresponding sampling frequency, and thus a larger storage space occupied and a greater transmission bandwidth required for external transmission. The opposite is true if the bitrate is lower.

Continuing with the above example, if the encoded information of the pulse signals in the unit time, which is obtained through operation 204, is $2^k$ bits of data, a corresponding bitrate of the encoded information of the pulse signals in the unit time is $2^k$ for the spatial region, and a corresponding bitrate of the encoded information of the pulse signals in the unit time is $N*2^k$ for the whole observation scenario, where N is a number of signal collectors in the collector array covering the area of the whole observation scenario, and N is an integer greater than 1.

The encoding methods for a pulse signal in the embodiments of the present disclosure may be implemented by an encoding apparatus or a pulse camera for a pulse signal. Upon obtaining encoded information, the encoding apparatus or the pulse camera may store the encoded information in a local storage space in a first-in first-out (FIFO) manner and output the encoded information in the local storage space in a certain output frequency for use in subsequent analysis or image reconstruction.

In a specific implementation, when the encoded information of the pulse signals corresponding to the area of the whole observation scenario is stored in the local storage space, the storage region of the local storage space may be correspondingly divided into a plurality of storage regions based on a positional relationship of the spatial regions corresponding to the signal collectors in the collector array in the whole observation scenario. The encoded information of the pulse signals corresponding to each spatial region may be correspondingly stored, in the FIFO manner, in a corresponding storage region of the local storage space. When the encoded information in the local storage space is externally output, encoded information for the same time period in a plurality of storage regions may be output according to a temporal relationship. The storage mode and output mode of the encoded information in the local storage space are not limited in the embodiments of the present disclosure.

In some embodiments, a sampling frequency may be predetermined as the above sampling frequency, or the predetermined sampling frequency may be adjusted according to actual needs, and the adjusted sampling frequency may be used as the above sampling frequency.

In some specific examples, the sampling frequency may be determined or adjusted based on a size of the local storage space, a data volume and an output frequency of the encoded information, such that the local storage space may satisfy both the storage requirement of the encoded information and the requirement of externally outputting the encoded information.

The local storage space is of the size of the storage space in the encoding apparatus or the pulse camera itself. The data volume of the encoded information may be measured by a data volume of encoded information of pulse signals in one unit time. Alternatively, the data volume may be measured by the data volume of the encoded information of the pulse signals within 1 s, where the data volume of the encoded information of the pulse signals within 1 s may also be referred to as a data rate of the encoded information. The output frequency is the frequency at which the encoding apparatus or the pulse camera outputs the encoded information in the local storage space. For example, the encoded information of the size of the local storage space is output every 1 s, and the encoded information is the encoded information of the pulse signals corresponding to the area of the whole observation scenario.

Alternatively, in some other specific examples, the sampling frequency may be determined or adjusted based on the size of the local storage space, the bitrate and a transmission bandwidth of the encoded information. The transmission bandwidth is a bandwidth between the encoding apparatus or the pulse camera and an opposite-end device when the encoding apparatus or the pulse camera externally transmits data. Therefore, the encoded information of the pulse signals, which is obtained through encoding based on the above embodiments of the present disclosure. may satisfy both the size requirement of the local storage space and the requirement of externally outputting the encoded information.

Alternatively, in yet some specific examples, the sampling frequency may be also determined or further adjusted based on the requirements of the observation scenario. For example, the sampling frequency may be determined based on a motion speed of an observed object (located in the observation scenario). When the motion speed of the observed object is high or increased, the above sampling frequency needs to be increased in order to implement continuous recording and representation of the high-speed motion process of the observed object. On the contrary, when the motion speed of the observed object is low or decreased, the above sampling frequency may be decreased in order to lower the pressure on storage, transmission, and subsequent calculations of the encoded information.

In some embodiments, after the encoded information of the pulse signals in the unit time is obtained based on the embodiments of the present disclosure, the encoded information of the pulse signals may also be compressed-encoded by using a preset compression-encoding algorithm, such as predictive encoding, run-length encoding, or entropy encoding (for example, regular variable-length codes such as exponential-Golomb codes, equal-length encoding, or non-equal-length encoding based on a probability distribution, etc.), to form a more efficient compressed bit stream so as to obtain compressed-encoded information.

The encoded information of the pulse signals is compressed-encoded based on the preset compression-encoding algorithm, which may implement several fold compression of the encoded information, thereby facilitating a reduction in the occupancy of the local storage space and an improvement of the storage efficiency, as well as an improvement of the external transmission efficiency of the encoded information and improvement of the utilization of bandwidth resources.

Accordingly, in some possible implementations, after the compressed-encoded information is stored or externally transmitted, the compressed-encoded information may be decoded by using a decoding mode corresponding to the above preset compression-encoding algorithm when the encoded information is required, so as to decode and restore the compressed-encoded information to the encoded information of the pulse signals.

In some embodiments, after the encoded information of the pulse signals is obtained based on the embodiments of the present disclosure, a pulse eigenvalue corresponding to each sampling instant in a time unit may also be determined based on the encoded information of the pulse signals, and then light intensity values of a corresponding spatial region at respective sampling instants may be obtained based on the pulse eigenvalues corresponding to respective sampling instants in the time unit.

Specifically, based on the pulse eigenvalues corresponding to respective sampling instants in the time unit, it may be determined whether a respective pulse signal is generated in each time unit. A time interval, i.e., a pulse width, between any two pulses may be determined based on the pulse signals. Then, a light intensity value within a corresponding time period may be estimated based on each pulse width. A shorter pulse width indicates a stronger light intensity. On the contrary, a longer pulse width indicates a weaker light intensity.

For example, a light intensity value i of any imaging element at any instant may be expressed as: $i:=(2^k-1)/\tau$. In the formula, $\tau$ is a pulse width of the pulse at the instant. In practice, time measurement is always of limited precision, i.e., $\tau$ is an integer value. When $\tau=1$, the pulse width is shortest, indicating a strongest light intensity within this time period, and $i=2^k-1$. In this case, the pulse eigenvalue in each time unit is 1, and the pulse sequences in the unit time are represented by a number n of 1. When $\tau=2^k-1$, indicating that only one pulse is accumulated after $\tau=2^k-1$ time units, the light intensity value in the unit time is estimated as: $i=1$. When $\tau>2^k-1$, $i<1$, and if $i=0$ is directly used, it indicates that an image with a bit depth of k can be generated; and if i is allowed to use a decimal or k is increased, an image with a wider dynamic range can be generated. Theoretically, the pulse width can be infinitely long, so that any intensity of light can be represented. However, there must be a dark current in an actual circuit, and the weakest light that can be represented has a higher intensity than that of the dark current.

In some embodiments, after the light intensity value of the corresponding spatial region at each sampling instant is obtained, target detection may also be performed based on the light intensity values of one or more spatial regions in the observation scenario at the respective sampling instants. Since visual information of a particular target is substantially unchanged in a particular observation scenario, target tracking can be implemented based on light intensity values of one or more spatial regions in the observation scenario in a time domain.

Based on this embodiment, motion information of a target that is contained in the encoded information of the observation scenario may be obtained by analyzing the pulse array and temporal characteristics thereof, so as to obtain descriptions of the position and motion process of the target.

In some embodiments, after the light intensity values of the corresponding spatial region at respective sampling instants is obtained, a reconstructed image of the observation scenario at the respective sampling instants may also be generated, by using a preset pulse reconstruction algorithm, based on the light intensity values of all the spatial regions in the observation scenario at the respective sampling instants. A grayscale value of each pixel in the reconstructed image represents a light intensity value of a spatial region corresponding to each pixel, i.e., in the reconstructed image at each sampling instant, a pixel value of each pixel (i, j) is the light intensity value of the spatial region corresponding to the pixel.

The preset pulse reconstruction algorithm may be, for example, a pulse reconstruction algorithm based on interspike interval (ISI), a pulse reconstruction algorithm based on fixed window sliding (TFP), and a pulse reconstruction algorithm based on convolutional neural network (CNN). The pulse reconstruction algorithm specifically used is not limited in the embodiments of the present disclosure.

Based on this embodiment, the light intensity value of each pixel at any instant may be estimated from the pulse width of the pulse where it is located, so that the image at any instant may be estimated. For example, when the sampling frequency in operation 202 is $2^k$ Hertz, $2^k$ frames of images may be generated every 1 s. The position and shape of the target that are contained in the encoded information of the observation scenario may be obtained by performing target detection on the reconstructed image of the observation scenario at a sampling instant, and the motion information of the target that is contained in the encoded information of the observation scenario may be obtained by performing target detection and tracking on the reconstructed image at each sampling instant, thereby implementing recording of the position and motion process of the target.

Figure 3:
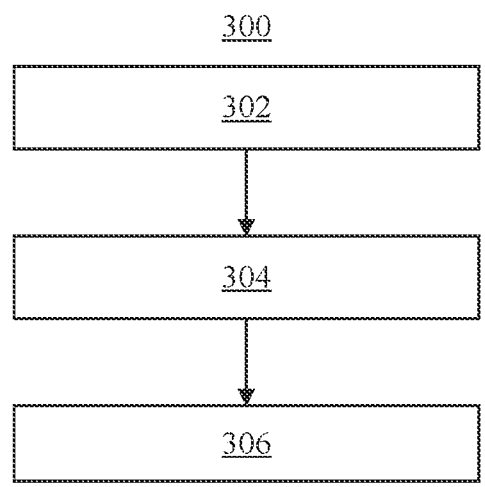
FIG. 3 is a flowchart of an encoding method for a pulse signal according to an embodiment of the present disclosure.

FIG. 3 is a flowchart of an encoding method (multi-bit synchronization encoding mode) 300 for a pulse signal according to an embodiment of the present disclosure. The pulse sequence for the given pixel includes a pulse eigenvalue indicating whether a respective pulse signal is generated for the given pixel at each instant. As shown in FIG. 3, encoding respective pulse sequences for the plurality of pixels includes the steps as follows.

For any pulse sequence of the respective pulse sequences:

In 302: the pulse sequence is sampled at a sampling frequency to obtain pulse eigenvalues corresponding to respective sampling instants.

In 304: in response to an end of each unit time period, data to be encoded in the unit time period is determined based on a current encoding mode and the pulse eigenvalues corresponding to respective sampling instants in the unit time period, where the unit time period is data frame output period for example, and is determined based on a data frame output frequency.

In the embodiments of the present disclosure, the pulse sequence is a spiking stream or a pulse signal stream, and the pulse eigenvalue is used to indicate whether a pulse signal is generated. Two preset values may be used to respectively indicate whether a pulse signal is generated and not generated. For example, in some implementations, binary symbols of 1 and 0 may be used as pulse eigenvalues to respectively indicate that a pulse signal is generated and not generated at a corresponding instant.

In 306: the data to be encoded in the unit time period is encoded based on the current encoding mode, to obtain the encoded information corresponding to the unit time period.

Based on this embodiment, continuous recording and digital representation of a light process may be implemented through the pulse sequence. The pulse sequence generated by each imaging element may be used to estimate the light intensity at any instant so as to obtain the image at any instant, thereby implementing continuous imaging, exhibiting a high time sensitivity, a high-frequency representation capability, and an ultrastrong representation capability for a high-speed motion process, enabling effective recording of a high-speed motion, such as of a rotating wheel, a high-speed moving table tennis ball or even a football, capture of motion details in a monitoring scenario, and thus support for special needs such as scientific research and high-precision detection. In addition, in this embodiment, instead of being output in real time after being generated, the pulse sequence is output after being encoded at a low frequency in a unit time period, so as to reduce the pressure on data storage and transmission.

In some embodiments, optical signals in the spatial region are accumulated to obtain a signal accumulation value. Then, in response to an end of a unit time period, if the signal accumulation value does not reach a preset threshold in the unit time period, the signal accumulation value is output. Thereafter, operation 304 is performed to obtain the data to be encoded in the unit time period based on the current encoding mode and the pulse eigenvalue for each sampling instant in the unit time period and/or the signal accumulation value.

In an example, after the signal accumulation value is output, the signal accumulation value may be further set to zero for re-accumulation.

Based on the embodiments of the present disclosure, the signal accumulation value may be directly output if the signal accumulation value does not reach the preset threshold in the unit time period.

In some embodiments, the sampling frequency in operation 302 is 2n Hertz (Hz), where n is an integer greater than or equal to 0. Then in operation 302, the generated pulse sequence is sampled at a sampling frequency of 2n Hertz to obtain pulse eigenvalues corresponding to respective sampling instanta in a $\frac{1}{2n}$ time unit prior to the sampling instant, where the pulse eigenvalue in the $\frac{1}{2n}$ time unit is an identifier used for representing whether there is a pulse signal in the $\frac{1}{2n}$ time unit, and may specifically be 0 or 1, with 0 indicating that no pulse signal is generated in the $\frac{1}{2n}$ time unit and 1 indicating that a pulse signal is generated in the $\frac{1}{2n}$ time unit.

For example, in a specific example, it is assumed that n=2. In one unit time, in the ½n time units corresponding to sampling instants: a pulse is generated, a pulse is generated, no pulse is generated, and a pulse is generated, and then the pulse eigenvalues in the ½n time units corresponding to the sampling instants in the unit time, which are obtained through operation 302, are respectively 1101. In a specific implementation, the unit time may specifically be 1 second (s), 1 millisecond (ins), 1 microsecond (us), etc., which is not limited in the embodiments of the present disclosure, and then the corresponding ½n time unit may be ½n s, ½n ms, ½n us, etc. Unless otherwise stated, the embodiments of the present disclosure are illustrated with a unit time of 1 s as an example, but other unit times are equally applicable. For example, for the unit time of 1 s, the pulse eigenvalues within the durations of 250 ms corresponding to sampling instants in 1 s are respectively 1101 based on this specific example.

Accordingly, in some possible implementations, the preset data frame output frequency in operation 304 is a data frame output frequency of 2 m Hertz, where in is an integer greater than or equal to 0, and m is less than n. In a specific implementation, m may be much less than n. For example, when n is 20, m is 5. In this case, a sampling time length between two adjacent data frames is ½n-m unit time, which is referred to as a data frame period, and the data frame has a bit depth of (n-m) bits (referred to as multi-bit). Such a configuration may be referred to as a (n, m) synchronization encoding scheme.

When recording the color of a digital image, a computer actually represents the color with the bit depth required for each pixel. The computer is capable of displaying colors by using a number representation unit, called bit, to record data of the represented colors. When the data is recorded in the computer in an organized manner, a computer file of the digital image is formed. A bit is the smallest unit in computer memory, which is used to record the color value of each pixel. Richer colors of an image require more bits. The number of bits used for each pixel in the computer is the bit depth.

In the embodiments of the present disclosure, prior to operation 304, the current encoding mode may also be obtained. The current encoding mode may include, for example, at least one of a pulse number encoding mode, an instantaneous pulse encoding mode, a strongest pulse encoding mode, etc.

For example, encoding mode information may be preset, and then in this embodiment, an encoding mode corresponding to the preset encoding mode information may be obtained as the current encoding mode. Alternatively, the encoding mode information may be input by a user, and then in this embodiment, an encoding mode corresponding to the received encoding mode information may be determined as the current encoding mode. Alternatively, a plurality of types of encoding mode information may be preset, and then in this embodiment, an encoding mode may be selected, from the preset encoding mode information, as the current encoding mode according to a preset selection mode (such as sequential selection, random selection, or reverse selection). Alternatively, encoding modes corresponding to various application scenarios may be preset, and then in this embodiment, a current application scenario may be determined based on currently set application scenario information or user-input application scenario information, and an encoding mode corresponding to the current application scenario may be obtained as the current encoding mode.

Figure 4:
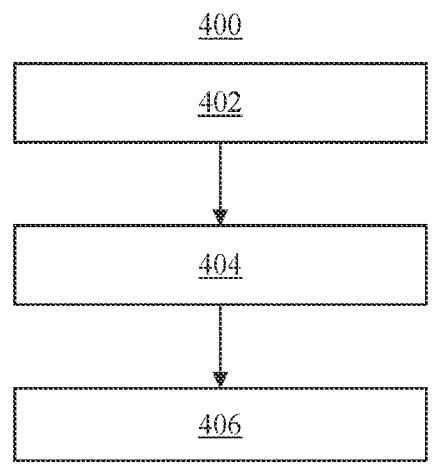
FIG. 4 is a flowchart of an encoding method for a pulse signal according to an embodiment of the present disclosure.

FIG. 4 is a flowchart of an encoding method 400 for a pulse signal according to an embodiment of the present disclosure. As shown in FIG. 4, when the current encoding mode is the pulse number encoding mode, the encoding method of this embodiment includes the steps as follows.

In 402: the generated pulse sequence is sampled at a sampling frequency to obtain pulse eigenvalues for respective sampling instants.

In 404: in response to an end of each unit time period, a quantity of pulse signals generated in the unit time period is determined, as data to be encoded in the unit time period, based on the pulse eigenvalue for each sampling instant within the ended unit time period.

The unit time period is determined based on a preset data frame output frequency. The quantity of pulse signals generated in each unit time period is in a range of [0, 2n-m-1].

In 406: the quantity of pulse signals generated in the unit time period is encoded into encoded information with a bit depth of (n-m) bits, which is then used as encoded information corresponding to the unit time period.

Figure 5:
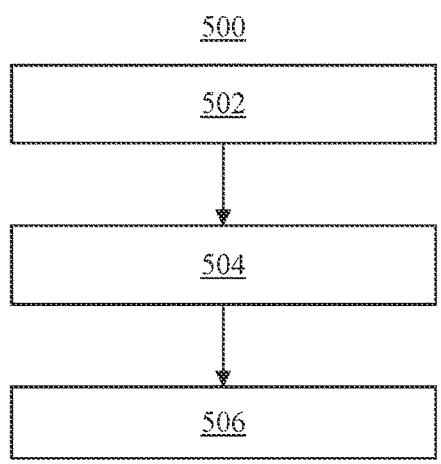
FIG. 5 is a flowchart of an encoding method for a pulse signal according to an embodiment of the present disclosure.

FIG. 5 is a flowchart of an encoding method 500 for a pulse signal according to an embodiment of the present disclosure. As shown in FIG. 5, when the current encoding mode is the instantaneous pulse encoding mode, the encoding method of this embodiment includes the steps as follows.

In 502: the generated pulse sequence is sampled at a sampling frequency to obtain pulse eigenvalues for respective sampling instants.

In 504: in response to an end of each unit time period, a pulse width of a pulse signal generated in the unit time period that is closest to a current instant is obtained, as data to be encoded in the unit time period, based on the pulse eigenvalue for each sampling instant within the ended unit time period.

The unit time period is determined based on a preset data frame output frequency.

In 506: the pulse width of the closest pulse signal is encoded into encoded information with a bit depth of (n-m) bits, which is then used as encoded information corresponding to the unit time period.

In a specific application, if no pulse signal occurs in the unit time period, the encoded information with a bit depth of (n-m) bits may be represented as all being 0 (i.e., a number (n-m) of 0). If a pulse signal occurs in the unit time period but has a start point located before the unit time period, a pulse width of the pulse signal is obtained and encoded into the encoded information with a bit depth of (n-m) bits.

Figure 6:
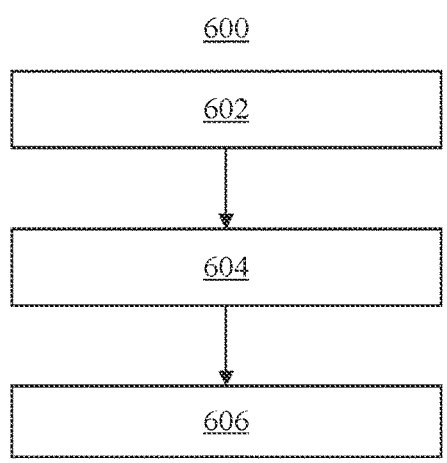
FIG. 6 is a flowchart of an encoding method for a pulse signal according to an embodiment of the present disclosure.

FIG. 6 is a flowchart of an encoding method 600 for a pulse signal according to an embodiment of the present disclosure. As shown in FIG. 6, when the current encoding mode is the strongest pulse encoding mode, the encoding method of this embodiment includes the steps as follows.

In 602: the generated pulse sequence is sampled at a sampling frequency to obtain pulse eigenvalues for respective sampling instants.

In 604: in response to an end of each unit time period, a shortest pulse width among pulse widths of pulse signals generated in the unit time period is determined, as data to be encoded in the unit time period, based on the pulse eigenvalue for each sampling instant within the ended unit time period.

The unit time period is determined based on a preset data frame output frequency.

In 606: the shortest pulse width is encoded into encoded information with a bit depth of (n-m) bits, which is then used as encoded information corresponding to the unit time period.

In a specific application, if no pulse signal occurs in the unit time period, the encoded information with a bit depth of (n-m) bits may be represented as all being 0 (i.e., a number (n-m) of 0). If a pulse signal occurs in the unit time period but has a start point located before the unit time period, a pulse width of the pulse signal is obtained and encoded into the encoded information with a bit depth of (n-m) bits.

In some embodiments, the bitrate of the encoded information may also be determined based on the sampling frequency, the data frame output frequency, and the bit depth of the encoded information.

The bitrate, i.e., bit rate, is the number of data bits (i.e., the number of bits) transmitted in unit time during transmission of encoded information, in a unit of bits per second (bit/s or bps), kilo-bits per second (kbit/s or kbps), or megabits per second (Mbps). A higher bitrate indicates a greater amount of data stored and transmitted in a unit time, and thus a better effect of recording and representing visual information. However, a greater volume of data of encoded information in the unit time indicates a higher corresponding sampling frequency and data frame output frequency, and thus a larger storage space occupied and a greater transmission bandwidth required for external transmission. The opposite is true if the bitrate is lower.

Based on the above embodiment, when the sampling frequency is 2n Hertz, the data frame output frequency is 2 m Hertz, and the bit depth of the encoded information is (n-m) bits, the bitrate of the encoded information corresponding to each signal collector is determined to be 2 m(n-m) bps. Similarly, based on the encoded information corresponding to all the spatial regions in the observation scenario, the bitrate of the encoded information corresponding to the observation scenario may be determined to be S*2 m(n-m) bps. S is a number of signal collectors in a collector array covering the area of the whole observation scenario, and S is an integer greater than 1.

The encoding methods for a pulse signal in the embodiments of the present disclosure may be implemented by an encoding apparatus or a pulse camera for a pulse signal. Upon obtaining encoded information, the encoding apparatus or the pulse camera may store the encoded information in a local storage space in a first-in first-out (FIFO) manner and output the encoded information in the local storage space in a certain data frame output frequency for use in subsequent analysis, target retrieval, image reconstruction, and other applications.

In a specific implementation, when the encoded information corresponding to the area of the whole observation scenario is stored in the local storage space, the storage region of the local storage space may be correspondingly divided into a plurality of storage regions based on a positional relationship of the spatial regions corresponding to the signal collectors in the collector array in the whole observation scenario. The encoded information corresponding to each spatial region may be correspondingly stored, in the FIFO manner, in a corresponding storage region of the local storage space. When the encoded information in the local storage space is externally output, encoded information for the same time period in a plurality of storage regions may be output according to a temporal relationship. The storage mode and output mode of the encoded information in the local storage space are not limited in the embodiments of the present disclosure.

In some embodiments, a sampling frequency may be predetermined as the above sampling frequency, or the predetermined sampling frequency may be adjusted according to actual needs, and the adjusted sampling frequency may be used as the above sampling frequency.

For example, in some specific examples, the sampling frequency may be determined or adjusted based on a size of the local storage space, the bit depth of the encoded information, and a quantity of imaging elements (i.e., signal collectors) included in the encoding apparatus for generating a pulse signal, such that the local storage space may satisfy both the storage requirement of the encoded information and the requirement of externally outputting the encoded information. The local storage space is of the size of the storage space in the encoding apparatus or the pulse camera itself.

Alternatively, in some other specific examples, the sampling frequency may be determined or adjusted based on the size of the local storage space, the bitrate and the transmission bandwidth of the encoded information. The transmission bandwidth is a bandwidth between the encoding apparatus or the pulse camera and an opposite-end device when the encoding apparatus or the pulse camera externally transmits data. Therefore, the encoded information obtained through encoding based on the above embodiments of the present disclosure may satisfy both the size requirement of the local storage space and the requirement of externally outputting the encoded information.

Alternatively, in yet some specific examples, the sampling frequency may be determined or adjusted based on requirements of a current application scenario. For example, the sampling frequency may be determined based on a motion speed of an observed object (located in the monitoring scenario). When the motion speed of the observed object is high or increased, the above sampling frequency needs to be increased in order to implement continuous recording and representation of the high-speed motion process of the observed object. On the contrary, when the motion speed of the observed object is low or decreased, the above sampling frequency may be decreased in order to lower the pressure on storage, transmission, and subsequent calculations of the encoded information.

In addition, in some possible implementations, a data frame output frequency may be predetermined as the preset data frame output frequency, or the predetermined data frame output frequency may be adjusted according to actual needs, and the adjusted data frame output frequency may be used as the preset data frame output frequency.

For example, in some specific examples, the preset data frame output frequency may be determined or adjusted based on the size of the local storage space, the sampling frequency, the bit depth of the encoded information, and the number of imaging elements included in the encoding apparatus, such that the local storage space may satisfy both the storage requirement of the encoded information and the requirement of externally outputting the encoded information.

Alternatively, in some other specific examples, the preset data frame output frequency may be determined or adjusted based on the size of the local storage space, the bitrate and the transmission bandwidth of the encoded information, such that the encoded information obtained through encoding based on the above embodiments of the present disclosure may satisfy both the size requirement of the local storage space and the requirement of externally outputting the encoded information.

Alternatively, in yet some specific examples, the preset data frame output frequency may be determined or adjusted based on the requirements of the current application scenario, so as to satisfy real-time observation requirements for the observed object. For example, when real-time detection is required for the observed object, the data frame output frequency needs to be increased. On the contrary, when there is a low real-time detection requirement for the observed object, the data frame output frequency may be decreased.

In the embodiments of the present disclosure, a high-speed sampling frequency of 2n Hertz is used for synchronously recording the presence (or not) of a pulse in a ½n time unit for each sampling, and a data frame output frequency of 2 m Hertz is used for encoding pulse eigenvalues within unit time periods into encoded information with a bit depth of (n-m) bits. Such an encoding mode may be referred to as multi-bit synchronization encoding, and the corresponding pulse vision model may also be referred to as a multi-bit synchronization pulse model.

The embodiments of the present disclosure provide multi-bit synchronization encoding, which can take into consideration both a micro-second pulse representation precision required for a high dynamic range and a millisecond precision required for high-speed motion representation. Specifically, the light process is continuously recorded and synchronously represented at a high frequency by using a pulse sequence so as to achieve a high dynamic performance, and a multi-bit encoded data frame is synchronously output at a lower frequency instead of outputting the pulse sequence in real time.

In some embodiments, after the encoded information corresponding to the unit time period is obtained based on the embodiments of the present disclosure, the encoded information corresponding to the unit time period may also be compressed-encoded by using a preset compression-encoding algorithm, such as predictive encoding, run-length encoding, or entropy encoding (for example, regular variable-length codes such as exponential-Golomb codes, equal-length encoding, or non-equal-length encoding based on a probability distribution, etc.), to form a more efficient compressed bit stream so as to obtain compressed-encoded information.

The encoded information is compressed-encoded based on the preset compression-encoding algorithm, which may implement several fold compression of the encoded information, thereby facilitating a reduction in the occupancy of the local storage space and an improvement of the storage efficiency, as well as an improvement of the external transmission efficiency of the encoded information and improvement of the utilization of bandwidth resources.

Accordingly, in some possible implementations, after the compressed-encoded information is stored or externally transmitted, the compressed-encoded information may be decoded by using a decoding mode corresponding to the above preset compression-encoding algorithm when the encoded information is required, so as to decode and restore the compressed-encoded information to the encoded information.

In some embodiments, after the encoded information corresponding to the unit time period is obtained based on the embodiments of the present disclosure, or after the compressed-encoded information is decoded to obtain the encoded information corresponding to the unit time period, the light intensity value corresponding to the encoded information may also be determined based on the current encoding mode and the encoded information corresponding to the unit time period.

In a specific implementation, when the current encoding mode is the pulse number encoding mode, the quantity of pulse signals generated in the unit time period has been recorded in the encoded information corresponding to the unit time period. Therefore, the quantity of pulse signals generated in the unit time period may be determined based on the encoded information corresponding to the unit time period, and an average light intensity value in the unit time period may then be obtained based on the unit time period and the quantity of pulse signals generated in the unit time period.

In a specific implementation, a shorter pulse width indicates a stronger light intensity. On the contrary, a longer pulse width indicates a weaker light intensity, i.e., the light intensity value is inversely proportional to the pulse width. Within a certain time period, a greater number of pulses indicates a stronger light intensity. On the contrary, a smaller number of pulses indicates a weaker light intensity, i.e., the light intensity value is inversely proportional to the number of pulses. Therefore, the light intensity value within the corresponding time period may be estimated based on the pulse width and/or the number of pulses.

For example, when the current encoding mode is the pulse number encoding mode, a light intensity value i of any imaging element at any instant may be obtained by: $i=a*C/T$. In the formula, T is a duration of a unit time period, C represents a quantity of pulse signals generated in the unit time period, and a is a constant greater than zero, and a may be specifically set according to actual needs.

With the pulse number encoding mode, a high dynamic range image may be reconstructed by using a timed mode.

When the current encoding mode is the instantaneous pulse encoding mode, the pulse width of the pulse signal generated in the unit time period that is closest to the current instant has been recorded in the encoded information corresponding to the unit time period. Therefore, the pulse width of the pulse signal generated in the unit time period that is closest to the current instant may be determined based on the encoded information corresponding to the unit time period, and an instantaneous light intensity value corresponding to the pulse width of the closest pulse signal may then be obtained based on the pulse width of the closest pulse signal, so as to obtain an instantaneous light intensity for the current instant.

For example, when the current encoding mode is the instantaneous pulse encoding mode, an instantaneous light intensity value i corresponding to the pulse width of the closest pulse signal may be obtained by: $i=a*1/\tau$. In the formula, $\tau$ is a pulse width of a pulse signal generated in the unit time period that is closest to a current instant, and a is a constant greater than zero, and a may be specifically set according to actual needs.

With the instantaneous pulse encoding mode, the light intensity value at a data frame output instant may be accurately recorded, and by comparing light intensity values for two adjacent output instants to detect whether the light intensity has changed, machine vision tasks that need to detect light changes, such as target detection, may be effectively performed, thereby improving the performance of such machine vision tasks.

When the current encoding mode is the strongest pulse encoding mode, the shortest pulse width among pulse widths of pulse signals generated in the unit time period has been recorded in the encoded information corresponding to the unit time period. Therefore, the shortest pulse width among pulse widths of pulse signals generated in the unit time period may be determined based on the encoded information corresponding to the unit time period, and a maximum light intensity value corresponding to the shortest pulse width may then be obtained based on the shortest pulse width, so as to obtain a maximum light intensity value in the unit time period.

For example, when the current encoding mode is the strongest pulse encoding mode, an instantaneous light intensity value i corresponding to the maximum light intensity value corresponding to the shortest pulse width may be obtained by: $i=a*1/\tau$. In the formula, $\tau$ is a shortest pulse width among pulse widths of pulse signals generated in the unit time period, and a is a constant greater than zero, and a may be specifically set according to actual needs.

With the strongest pulse encoding mode, the occurrence of the strongest intensity of light may be recorded even if the pulse width is much shorter than the data frame period, thus ensuring that a maximum dynamic range is represented. By contrast, it may be averaged over the entire unit time period in the pulse number encoding mode, and such a short-time strong pulse may be missed in the instantaneous pulse synchronization encoding mode. Each of the three encoding modes, i.e., the pulse number encoding mode, the instantaneous pulse encoding mode, and the strongest pulse encoding mode, has an advantage to make up for disadvantages of the other two modes. Therefore, during actual encoding, any one or more of the encoding modes may be used at the same time.

In one specific application, a pulse with a pulse width of $\frac{1}{2}n$ time unit corresponds to a photocurrent intensity with a maximum value of $2n \times Q \times 1.602176634 \times 10{-19}$ A, where Q is a number of full well charges. When the pulse width is 1 s ($2n$ time units), the corresponding photocurrent intensity is $Q \times 1.602176634 \times 10{-19}$ A. If the photocurrent is accumulated and imaged with 1 s as a unit time, a dynamic range of the image is 20 log 2n. For n=20, the shortest pulse width is about 1 us, and the dynamic range is about 120 dB. For n=24, the shortest pulse width is about 62.5 ns, and the dynamic range is about 144 dB.

The foregoing dynamic range performance estimation is performed by assuming a linear relationship between light intensity and pulse width. If non-linear mapping, such as a logarithmic circuit, is used, the dynamic range may be greatly improved.

In some embodiments, after the light intensity value corresponding to the encoded information is determined, target detection may also be performed based on the light intensity values corresponding to the encoded information corresponding to one or more spatial regions in the observation scenario. Since visual information of a particular target is substantially unchanged in a particular observation scenario, target tracking can be implemented based on light intensity values of one or more spatial regions in the observation scenario in a time domain.

Based on this embodiment, motion information of a target that is contained in the encoded information of the observation scenario may be obtained so as to obtain descriptions of the position and motion process of the target.

In some embodiments, after the light intensity value corresponding to the encoded information is determined, a reconstructed image may also be generated for the observation scenario by using a preset pulse reconstruction algorithm based on the light intensity values corresponding to the encoded information corresponding to all the spatial regions in the observation scenario. Each pixel in the reconstructed image corresponds to one signal collector, and a grayscale value of each pixel in the reconstructed image represents a light intensity value of a spatial region corresponding to each pixel. In other words, in the reconstructed image, a pixel value of each pixel (i, j) is the light intensity value of the spatial region corresponding to the pixel.

The preset pulse reconstruction algorithm may be, for example, a pulse reconstruction algorithm based on inter-spike interval (ISI), a pulse reconstruction algorithm based on fixed window sliding (TFP), and a pulse reconstruction algorithm based on convolutional neural network (CNN). The pulse reconstruction algorithm specifically used is not limited in the embodiments of the present disclosure.

Based on this embodiment, the light intensity value of each pixel at any instant may be estimated from the pulse width of the pulse where it is located, so that the image at any instant may be estimated. The position and shape of the target that are contained in the encoded information of the observation scenario may be obtained by performing target detection on the reconstructed image of the observation scenario at an instant, and the motion information of the target that is contained in the encoded information of the observation scenario may be obtained by performing target detection and tracking on the reconstructed image at each instant, thereby implementing recording of the position and motion process of the target.

In addition, when the current encoding mode is the pulse number encoding mode, the quantity of pulse signals generated in the unit time period has been recorded in the encoded information corresponding to the unit time period. Therefore, the quantity of pulse signals generated in the unit time period may be determined based on the encoded information corresponding to the unit time period, and the quantity of pulse signals generated in the unit time period may be directly converted into a digital image with a bit depth of (n-m) bits, that is, directly obtaining the digital image without obtaining an average light intensity value in the unit time period and generating a reconstructed image based on the light intensity value. By accumulating digital images corresponding to a number a of unit time periods, an a×(n-m)-bit high dynamic image can be obtained.

A digital image is an image that is represented in a digital form, and it has currently become a preferred method for image representation of dynamic images, such as a video, because it is easier to process, transmit, and store. Based on this embodiment, when the current encoding mode is the pulse number encoding mode, a digital image can be directly obtained from the encoded information without performing light intensity value estimation and image reconstruction, thereby improving image generation efficiency and also processing, transmission, and storage effects.

After a digital image corresponding to the whole observation scenario is obtained based on digital images corresponding to the collector array covering the area of the whole observation scenario, target detection and tracking may be performed based on the digital image, thereby implementing recording of the position and motion process of the target.

Any of the encoding methods for a pulse signal provided in embodiments of the present disclosure may be performed by any suitable device with a data processing capability, including but not limited to: a camera device (such as a pulse camera), a terminal device, and a server. Alternatively, any of the encoding methods for a pulse signal provided in the embodiments of the present disclosure may be performed by a processor, for example, by invoking corresponding instructions stored in a memory. This is not detailed below.

In order to fundamentally solve the problem of highly efficient encoding of space-time signals such as in video, the present disclosure proposes a new scheme from two aspects of video representation and coding methods. Different from the method of representing a dynamic image as a sequence of image sequence (the "image" here is also called "frame") since the appearance of the film and television, the present disclosure first collects space-time signal change of each local spatial position constituting a monitoring area (for the image, it is a pixel change process), and performs time-domain coding according to time order respectively. For the dynamic image, this time-sequence signal is called a "pixel stream", which is used to obtain a pulse sequence of representing a change process of the space-time signal at the local spatial position; then, a pulse sequence matrix composed of time-sequence signals of each local spatial position is spatially encoded according to the spatial position relation (Spatial Sparsity) to obtain a pulse sequence array. It needs to be particularly noted that although multiple pixel streams are still arranged into an array according to spatial relative position, each pixel stream does not have equal interval sampling and "frame alignment" as in a traditional video, but retain change information and time-domain sparsity. The spatial encoding for the pixel stream array is not a simple image encoding, but an encoding for signal accumulation in the past period of time within the spatial range. Thus, this method can achieve high-efficiency spatial information encoding while retaining time-domain process information with high precision, and subverts the traditional method of space-time signal coding.

Figure 7:
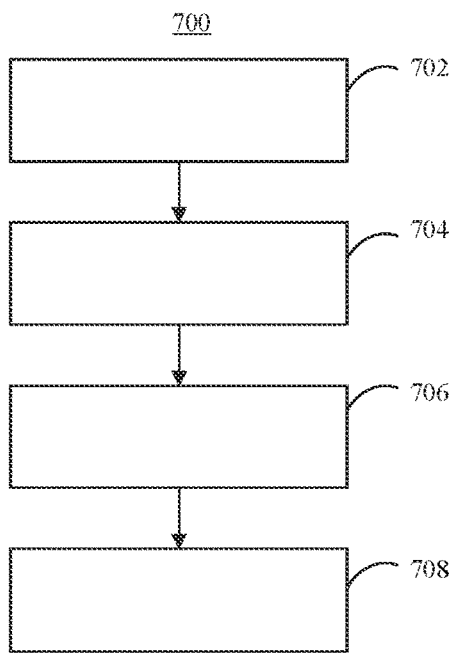
FIG. 7 is a processing flowchart illustrating a method for encoding space-time signals according to a first embodiment of the present disclosure.

This embodiment provides a process of a method 700 for encoding space-time signals. As shown in FIG. 7, the method 700 includes the following processing steps:

702: collecting a light signal in a monitoring area by a signal collector, and calculating a signal intensity value of the light signal and transmitting the signal intensity value to a signal accumulator.

Each signal collector collects a space-time signal from a designated local spatial position, generates a pulse sequence, and completes time-domain sampling; a plurality of signal collectors are arranged into an array and cooperate with each other to cover the entire monitoring area, and complete space-domain sampling of the monitoring area.

The space-time signal is an optical signal. The signal collector is a photosensitive device to realize photoelectric conversion, and the intensity of the electrical signal at the output end is positively correlated to the collected light intensity. Each photosensitive device is responsible for a small square local area, and all devices are arranged into a neat square array by ranks. A honeycomb pattern (hexagonal segmentation), triangular segmentation, or other arrangements may also be used, and in this case, the central locations of the signal collectors may not be in a straight line. Each signal collector corresponds to a specific local spatial position, so the signal collector itself identifies the local spatial position of the output optical signal.

Each the signal collector collects the space-time signal of the local spatial position according to a set collection time interval. The frame rate of the current common cameras is 24 to 120 (frames/second), that is, the time interval is tens of milliseconds. The time interval of the present disclosure is obviously shorter, and it can be milliseconds, microseconds, nanoseconds and even picoseconds as required.

A signal collector is connected to one or more signal accumulators, and the signal collector transmits the signal intensity value to the signal accumulators to which it is connected.

704: calculating a cumulative signal intensity value of each local space position in a past period of time by the signal accumulator, and outputting the cumulative signal intensity value to a filter.

The signal accumulator accumulates the signal in the past period of time, and its output is the cumulative signal intensity value.

A signal collector can output a signal to one or more signal accumulators.

A signal accumulator is connected to only one filter as an input of the filter.

A filter can receive inputs from one or more signal accumulators. That is, a fan-out of the signal accumulator is 1, while a fan-in of the filter can be 1 or greater.

The simplest case is that the signal collector, the signal accumulator and the filter are in a one-to-one correspondence: one signal collector acts as and only as an input of one signal accumulator, and the signal accumulator is then connected to one filter and acts as and only as an input of the filter. The filter only accepts the input of the signal accumulator and does not accept inputs of other signal accumulators.

When a signal collector fans out a plurality of signal accumulators, there are at least three ways to transmit the signal intensity value: when the signal collector is connected to a plurality of signal accumulators, the signal collector outputs the same signal intensity value to all downstream signal accumulators at the same time; or, the signal intensity value is evenly assigned to all downstream signal accumulators; or, the signal intensity value is assigned to all downstream signal accumulators according to a certain weight, and the weight is a function of spatial position distances between the signal accumulators and the signal collector.

The signal accumulator is a time-limited rolling signal accumulator or a time-unlimited signal accumulator. The time-limited rolling signal accumulator only accumulates signal within a specific period of time before the current time, and the earlier signal is automatically cleared; and the time-unlimited signal accumulator implements accumulation continuously.

The signal accumulator transfers cumulative signal intensity value to a filter to which it is connected. The filter takes one or more signal accumulators as inputs and transforms the input cumulative signal intensity values according to a specific filter function.

706: transforming the cumulative signal intensity values from the signal accumulator according to a specific filter function by the filter, so as to obtain transformation coefficients related to signal distribution within the local spatial position. When a transformation coefficient exceeds a set threshold, the filter outputs a pulse signal represented by a numerical value corresponding to the local spatial position. The pulse signal carries pulse intensity, and there is a corresponding relationship between the pulse intensity and the cumulative signal intensity value. The filter obtains the local spatial position information of the input signal according to the connected signal accumulator.

After the filter outputs the pulse signal, all the signal accumulators of the filter are reset.

In order to capture spatial sparse mode of any location and any scale as much as possible, the filter function of the filter is set according to sparsity of a spatial position that the filter needs to capture, and the sparsity of the spatial position that the filter needs to capture is determined according to a local spatial scope of a signal collected by the signal collector associated with the filter. The monitoring area is covered by using multiple filters through a redundant design, and a sparse mode of each local spatial position in the monitoring area can be captured by a corresponding filter. A multi-level redundancy design is adopted on space scale coverage for the multiple filters. The filters of different levels are sensitive to spatial sparsity of corresponding space scales. An effective capture of any scale sparsity in the monitoring area is realized by a cooperation of the multi-level filters.

The simplest case is that a filter only accepts the input from a signal accumulator. A filter may also receive inputs from a plurality of signal accumulators. Each filter transforms cumulative signal intensity values corresponding to local spatial position from the respective signal accumulator according to a specific filter function, and obtains transformation coefficients corresponding to the local spatial position.

A simple form of filter is a binary filter, that is, the filter function is a threshold function. When there is only a signal accumulator as the input of the binary filter, if the cumulative signal intensity value input by the signal accumulator exceeds a specified threshold, the binary filter outputs a pulse signal, otherwise no pulse signal is output.

When there are multiple signal accumulators as inputs of the binary filter, the binary filter implements a simple accumulation or a weighted accumulation according to certain rules, and performs a filtering transformation for cumulative signal intensity values input by the multiple signal accumulators. If the transformation result exceeds a specified threshold, the binary filter outputs a pulse signal, otherwise no pulse signal is output. In the weighted accumulation process of the cumulative signal intensity values, the earlier the collection time, the lower the signal weight.

The pulses output the binary filter are represented by binary numbers. When the filter outputs a pulse, it is represented by 1, otherwise it is represented by 0. At the same time, the binary filter with a pulse output outputs 1, and the binary filter without pulse output outputs 0. All these outputs at the same time constitute a binary sparse array according to the filter array. Binary coefficient arrays at all times are arranged into a binary sparse sequence array according to a sequence of equal time intervals specified by the clock, as an efficient binary expression of the space-time signal in the monitoring area.

The signal collector, the signal accumulator and the filter constitute a "collection-accumulation-transformation" triplet in a one-to-one form. That is, each signal collector outputs only one signal accumulator, and each signal accumulator outputs only one filter. The signal intensity at an output end of the signal accumulator represents an accumulative value of signal intensity collected by the signal collector over a past period of time. When the intensity exceeds a specific threshold, the filter outputs a pulse which is represented by a binary 1. In this way, the dynamic signal of the local spatial position corresponding to the signal collector is transformed to a binary sequence in which 1 appears intermittently, and a time interval between two 1s in the binary sequence indicates required time for accumulating a later 1 of the two is; and a binary sequence, in which all numbers are 1, indicates that the signal at the local spatial position corresponding to the signal collector is always in a highest intensity state.

Binary sequences generated by all "collection-accumulation-transformation" triplets are arranged into a binary sequence array according to the corresponding local spatial positions, as an efficient binary expression of the space-time signals in the monitoring area.

The signal collector is a photosensitive device, and all signal collectors are arranged into a photosensitive array. The signal accumulator is a photoelectric conversion circuit with a time accumulation function. The filter is a binary pulse filter, and the signal accumulator and the filter constitute a time-delay binary pulse filter. The device is a new type of camera device, in which an imaging unit (i.e., a "signal collector-signal accumulator-filter" group as mentioned above) works independently, and indicates a signal intensity corresponding to a local spatial position by outputting a pulse (binary 1) when the collected light intensity reaches a threshold.

The filter function can be more complex, such as a LoG (Laplacian of Gaussian) filter, which is most sensitive to a speckle type input. The filter function of a filter bank may be a family of functions that satisfies a certain relationship, and a typical example is a family of wavelet transform functions.

When a transformation coefficient corresponding to a certain local spatial position calculated by the filter exceeds a set threshold, the filter outputs a pulse signal reflecting the signal intensity of the corresponding local spatial position. The pulse signal can carry pulse intensity information, and the pulse intensity corresponds to the cumulative signal intensity value. When a transformation coefficient corresponding to a certain local spatial position does not exceed a set threshold, the filter does not output the pulse signal, and a low-level signal may be chose to output.

After the filter outputs the pulse signal, all signal accumulators of the filter are reset.

An encoding mode for a pulse sequence includes a single-bit synchronization encoding mode and a multi-bit synchronization encoding mode.

In the single-bit synchronization encoding mode: for any pulse sequence of the respective pulse sequences, in response to an end of each unit time period, the pulse sequence in the unit time period is sampled at a sampling frequency to obtain pulse eigenvalues corresponding to respective sampling instants in the unit time period, and the pulse eigenvalues corresponding to respective sampling instants in the unit time period is encoded to obtain the encoded information corresponding to the unit time period. In the multi-bit synchronization encoding mode: for any pulse sequence of the respective pulse sequences, the pulse sequence is sampled at a sampling frequency to obtain pulse eigenvalues corresponding to respective sampling instants; in response to an end of each unit time period determined based on a data frame output frequency, data to be encoded in the unit time period is determined based on a current encoding mode and the pulse eigenvalues corresponding to respective sampling instants in the unit time period, and the data to be encoded in the unit time period is encoded based on the current encoding mode, to obtain the encoded information corresponding to the unit time period.

708: arranging pulse signals corresponding to the local spatial position into a sequence in time order to obtain a pulse sequence expressing the local spatial position signal and a change process thereof; and arranging the pulse sequences of all the local spatial positions into a pulse sequence array according to the spatial position relation, which is served as an encoding for dynamic space-time signals of the monitoring area.

Each filter in the filter array sets its own output pulse signal according to its own threshold, and outputs between filters may not be synchronized. In this way, an encoding with the time-domain characteristic for the cumulative signal intensity value corresponding to the local spatial position is realized.

In practical applications, the filter can be an analog filter, and its output is a pulse sequence array.

In practical applications, the pulse signal output from the filter may only carry one bit of information, namely 0 (no pulse output) or 1 (with pulse output). A pulse sequence matrix is degraded to a bit sequence array, which is called a bit stream array.

In practical applications, an output of the signal accumulator is a value in a certain range. The filter is a digital filter and outputs a value in a certain range. The value output from the filter may have only two states: 0 (no output) or 1 (with output).

The pulse output of the filter is time-domain discretely expressed by using a high frequency clock, which makes the pulse outputs of the filter occur only at the time of equal intervals. Transformation coefficients output by all filters at the same time form a sparse array, and transformation coefficients corresponding to the filters without output at this time are 0, Sparse arrays are arranged into a transformation coefficient array in a sequence of equal time intervals as an efficient expression of the space-time signals in the monitoring area.

An operating frequency of the filter is higher than 1000 Hz, that is, a discrete time interval at which the filter is allowed to output is less than 1 millisecond, and may reach a microsecond, nanosecond or even picosecond level.

The signal collector is a high-sensitivity photosensitive device, and the signal accumulator is a high-sensitivity converter. Cooperating of the signal collector and the signal accumulator may accurately measure the quantity of collected photons. The time interval of pulses output from the filter is at a picosecond level, and the output binary sequence array represents the number of photon irradiation in the monitoring area.

At any time, a transformation coefficient array in the past period of time is inversely transformed by an inverse converter group corresponding to the filter, and space-time signals in the current time are reconstructed.

On the basis of a coefficient array arranged at the previous time, the existing transformation coefficient at the same position is replaced by the transformation coefficient at the current time, and the spatial signal at the current time is reconstructed. The dynamic signals are reconstructed by analogy.

The reconstructed image of time to is a pixel value of 1 at position (i, j), which is the number of 1 occurred in the corresponding binary sequence in the past Δ t, and Δ t may be set arbitrarily as needed.

The binary sequence is compactly represented by using fewer bits according to a statistical correlation before and after the binary sequence, which includes, but is not limited to, run-length encoding or arithmetic encoding, etc.

The binary sequence array is recoded according to a statistical correlation between adjacent and close sequences in space, such as arithmetic encoding, so as to reduce the number of bits used.

The binary sequence array is restored according to an inverse process of a compact bit stream generation process.

According to the regularity of the above-mentioned transformation coefficient array or the pulse sequence matrix, prediction coding, run-length coding, entropy coding and other methods are used for compression to form a more efficient compressed bit stream. An original coefficient sequence array is obtained by using a corresponding decoding algorithm for the compressed bit stream.

By analyzing the time-sequence characteristics of the pulse sequence array, the object motion information contained in the input signals may be obtained, and the description of the position and movement process of the object may be obtained. The analysis for the coefficient sequence array may detect an object and attribute the object included in the space-time signals.

This embodiment provides a device 800 for encoding space-time signals. A specific implementation structure of the device 800 includes a signal collector 81, a time-domain coding module and a space-domain coding module.

The signal collector 81 is used for collecting a space-time signal of each of local spatial positions in a monitoring area, wherein the local spatial positions constitute the monitoring area.

The time-domain coding module is used to perform time-domain coding on the space-time signal of the each local spatial position, so as to obtain a pulse sequence representing a change process of the space-time signal at the each local spatial position.

The space-domain coding module is used to perform space-domain coding on pulse sequences of all local spatial positions according to a spatial position relation to obtain a pulse sequence array.

Figure 8:
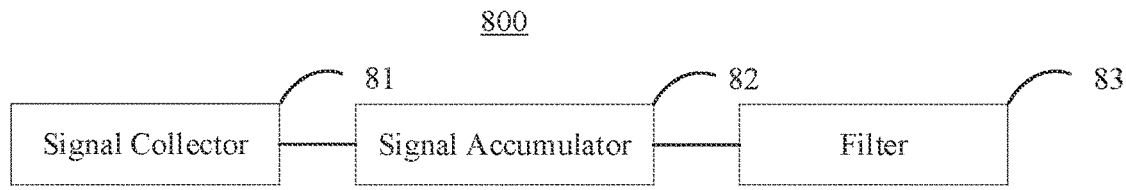
FIG. 8 is a specific implementation diagram illustrating a device for encoding space-time signals according to a second embodiment of the present disclosure.

In an embodiment of the present disclosure, as shown in FIG. 8, the time-domain coding module includes: a signal accumulator 82, a filter 83 and a processing unit.

The signal accumulator 82 is used to accumulate the space-time signal at the local spatial position according to the time to obtain a cumulative signal intensity value;

the filter 83 is used to transform the cumulative signal intensity value, and output a pulse signal when a transformation result exceeds a specific threshold; and the processing unit is used to arrange the pulse signals corresponding to the local spatial position into a sequence in time order to obtain a pulse sequence representing a change process of the space-time signal at the local spatial location.

In an embodiment of the present disclosure, the signal collector 81 is specifically used to collect the space-time signal from a designated local spatial position to complete time-domain sampling. A plurality of signal collectors 81 are arranged into an array to cooperate with each other to cover the monitoring area, and complete space-domain sampling of the monitoring area.

In an embodiment of the present disclosure, the space-time signal is an optical signal, and the signal collector 81 is a photosensitive device.

An electrical signal intensity, output by the signal collector 81 through photoelectric conversion, is positively related to the collected light intensity. One signal collector 81 is connected to one or more signal accumulators 82 transfers the electrical signal intensity to the connected signal accumulators 82.

The signal accumulator 82 accumulates a signal in the past period of time, and an output end of the signal accumulator 82 is the cumulative signal intensity value. A signal accumulator 82 is connected to a filter 83 and transfers the cumulative signal intensity value to the connected filter 83.

The filter 83 takes one or more signal accumulators 82 as input, and transforms the input cumulative signal intensity values according to a specific filter function. When a transformation result exceeds a specific threshold, the filter 83 outputs a pulse signal corresponding to the local spatial position.

In an embodiment of the present disclosure, when the signal collector 81 is connected to multiple signal accumulators 82, the signal collector 81 outputs a same electrical signal intensity to all downstream signal accumulators 82 at the same time; or, the electrical signal intensity is evenly assigned to all downstream signal accumulators 82; or, the electrical signal intensity is assigned to all downstream signal accumulators 82 according to a certain weight, and the weight is a function of spatial position distances between the signal accumulators 82 and the signal collector 81.

In an embodiment of the present disclosure, the signal accumulator 82 is a time-limited rolling signal accumulator 82 or a time-unlimited signal accumulator 82. The time-limited rolling signal accumulator 82 only accumulates signal in a specific period of time before the current time, and the earlier signal is automatically cleared; and the time-unlimited signal accumulator 82 implements accumulation continuously.

In an embodiment of the present disclosure, the filter function of the filter 83 is set according to sparsity of a spatial position that the filter 83 needs to capture, and the sparsity of the spatial position that the filter 83 needs to capture is determined according to a local spatial scope of a signal collected by the signal collector 81 associated with the filter 83; and/or
- the monitoring area is covered by using multiple filters 83 through a redundant design, and a sparse mode of each local spatial position in the monitoring area can be captured by a corresponding filter 83; and/or,
- a multi-level redundancy design is adopted on space scale coverage for the multiple filters 83, filters 83 of different levels are sensitive to spatial sparsity of corresponding space scales, and an effective capture of any scale sparsity in the monitoring area is realized by a cooperation of the multi-level filters 83; and/or,
- the filter 83 transforms the cumulative signal intensity value from the signal accumulator 82 according to a set filter function to obtain transformation coefficients related to signal distribution within the local spatial position; when a transformation coefficient exceeds a preset threshold, the filter 83 outputs a pulse signal, the pulse signal carries a pulse intensity, and there is a corresponding relationship between the pulse intensity and the cumulative signal intensity value; and/or,
- after the filter 83 outputs the pulse signal, all signal accumulators 82 corresponding to the filter 83 are reset.

In an embodiment of the present disclosure, the filter 83 is a binary filter 83, and the filter function is a threshold function.

When there is only one signal accumulator 82 as an input of the binary filter 83, if the cumulative signal intensity value input by the signal accumulator 82 exceeds a specified threshold, the binary filter 83 outputs a pulse signal, otherwise no pulse signal is output.

When there are a plurality of signal accumulators 82 as inputs of the binary filter 83, the binary filter 83 implements a simple accumulation or a weighted accumulation according to certain rules, and performs a filtering transformation for cumulative signal intensity values input by the plurality of signal accumulators 82. If the transformation result exceeds a specified threshold, the binary filter 83 outputs a pulse signal, otherwise no pulse signal is output.

In an embodiment of the present disclosure, the device further includes: a transformation coefficient processing module, which is configured to:
- discretely represent pulse outputs of the filter 83 in time domain by a high frequency clock, so that the pulse outputs of the filter 83 occur only at equal intervals, transformation coefficients output by all filters 83 at the same time form a sparse array, the transformation coefficients corresponding to filters 83 without output at this time are 0, and sparse arrays are arranged at equal time intervals into a transformation coefficient array as an expression for the space-time signals of the monitoring area.

In an embodiment of the present disclosure, the pulse output the binary filter 83 is represented by a binary number. When the binary filter 83 outputs a pulse, it is represented by 1, otherwise it is represented by 0; at the same time, the binary filter 83 with a pulse output outputs 1, and the binary filter 83 without output outputs 0.

The space-domain coding module is further configured to: outputs of all binary filters 83 at the same time constitute a binary sparse array according to an array of filters 83; binary sparse arrays at all tines are arranged into a binary sparse sequence array according to a sequence of equal time intervals specified by a clock, which acts as a binary expression of the space-time signals in the monitoring area.

In an embodiment of the present disclosure, the signal collector 81, the signal accumulator 82 and the filter 83 constitute a "collection-accumulation-transformation" triplet in a one-to-one form. That is, each signal collector 81 outputs only one signal accumulator 82, and each signal accumulator 82 outputs only one filter 83. The signal intensity at an output end of the signal accumulator 82 represents an accumulative value of signal intensity collected by the signal collector 81 over a past period of time. When the signal intensity exceeds a specific threshold, the filter 83 outputs a pulse signal.

In an embodiment of the present disclosure, the pulse signal is represented by a binary 1. The pulse sequence of the local spatial position corresponding to the signal collector 81 is a binary sequence in which 1 appears intermittently, and a time interval between two 1 s in the sequence indicates required time for accumulating a later 1 of the two Is. A binary sequence, in which all the numbers are 1, indicates that the signal at the local spatial position corresponding to the signal collector 81 is always in a highest intensity state.

All binary sequences are arranged into a binary sequence array according to the spatial positions as a binary expression of the space-time signals in the monitoring area.

In an embodiment of the present disclosure, the signal collector 81 is a photosensitive device, and all signal collectors 81 are arranged into a photosensitive array. The signal accumulator 82 is a photoelectric conversion circuit with a time accumulation function. The filter 83 is a binary pulse filter 83, and the signal accumulator 82 and the filter 83 constitute a time-delay binary pulse filter 83. The device is a new type of camera device, in which an imaging unit works independently, and outputs a pulse to indicate a signal intensity corresponding to a local spatial position when the collected light intensity reaches a threshold. An operating frequency of the filter 83 is higher than 1000 Hz.

In an embodiment of the present disclosure, the signal collector 81 is a high-sensitivity photosensitive device, and the signal accumulator 82 is a high-sensitivity converter. The signal collector 81 and the signal accumulator 82 cooperate to accurately measure the quantity of collected photons. The time interval of pulses output from the filter 83 is at a picosecond level, and the output binary sequence array represents the number of photon irradiation in the monitoring area.

The specific process of encoding the space-time signals by the device according to the embodiments of the present disclosure is similar to the embodiments of the method described previously, and will not be described in detail here.

In summary, the embodiments of the present are based on the idea of performing time-domain encoding and then space-domain encoding to propose that a space-time signal of a local spatial position is accumulated according to periods of time, a cumulative signal intensity value of the local spatial position is transformed according to a spatial sparsity, and a pulse signal corresponding to the local spatial position is output. Further, a sequence signal of the local spatial position is obtained, and sequence signals of all local spatial positions are arranged into a pulse sequence matrix. Thus, a coding method for space-time signals taking account of temporal information and spatial information simultaneously is provided.

The beneficial effects of the present disclosure include at least the following:
1) a change process of each local spatial position can be preserved, and a movement process of a high-speed moving object can be finely reconstructed, which can provide an abundant information source for subsequent motion analysis and object detection and tracking, while the frame rate is the upper limit of the change information preserved in the traditional video;
2) an image at any time can be reconstructed: a static image at a specific time is an accumulation of the change process over a past period of time, with the present disclosure, the image at any time can be reconstructed, while the traditional video only retains the image at the frame sampling time;
3) a high dynamic image at any time and in any space window can be reconstructed: the recording of the traditional video is an accumulation of light changes between two frames, and the corresponding dynamic range is often limited and fixed; with the present disclosure, the light in any period of time and any space window range can be accumulated, and the obtained dynamic range is determined by the light condition in the period of time and the space range, which is dynamic, and may be high dynamic;
4) it is beneficial for the design of time-domain compression algorithm: inter-frame prediction in traditional video compression involves complex motion estimation and motion compensation calculation, while in the present disclosure, the time-domain information is directly implied in the original code stream, which does not need to deliberately design complex algorithms such as the inter-frame prediction and the data such as the encoding motion vector, moreover, since the code stream of the present disclosure is "continuous" in the time domain (the time interval is also particularly small in the discrete mode, such as milliseconds or even smaller), and the correlation is stronger, it is easier to design efficient encoding algorithms;
5) it is beneficial for improving the efficiency of the space-domain compression: in the traditional video, the light changes in a period of time (between two frames) are "squeezed" forcibly in an image, which improves the complexity of the image, and improves the difficulty of the space-domain coding (mainly referring to the transform coding) in the traditional video compression, the cost of the residual expression is much; in the present disclosure, the dynamic image is represented by the sequence array, which may continue to use the transform coding method to compress (corresponding to the filter function and the family of functions of the filter bank), filters are not "forced" to perform transform coding synchronously at the same time as traditional methods, but each filter decides whether to output at any time according to its own input mode, so signal modes in the space domain may be captured better, and the efficiency of the space-domain compression is improved.

The pulse signals involved in the present disclosure have the following features: collecting spatiotemporal signals of individual local spatial positions in a monitored region, and accumulating the spatiotemporal signals of the local spatial positions based on time to obtain a accumulative signal intensity value; transforming the accumulative signal intensity value by a filter, and outputting a pulse signal when the transformation result exceeds a certain threshold; arranging the pulse signals corresponding to the local spatial positions in a sequence in a chronological order to obtain a pulse sequence representing the local spatial position signal and its change; and arranging the pulse sequences of all the local spatial positions based on a spatial position relationship to obtain pulse array signals.

Figure 9:
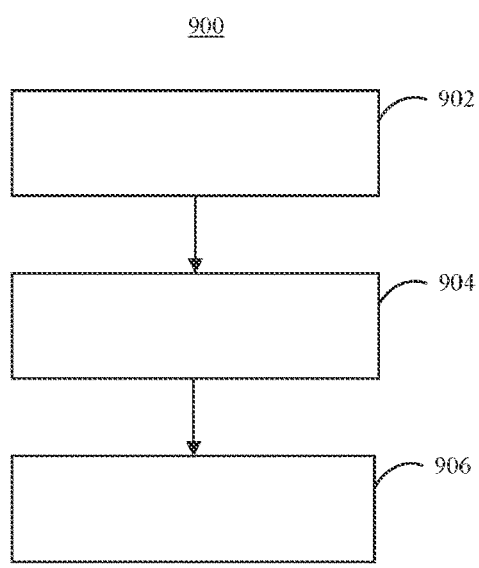
FIG. 9 is a schematic diagram showing steps of an imaging method according to an embodiment of the present disclosure.

An imaging method 900 is provided according to an embodiment of the present disclosure. As shown in FIG. 9, the imaging method 900 includes:

In 902, a pulse sequence for each pixel in a plurality of pixels in a unit time period before a specified time is obtained from encoded information The encoded information is obtained by encoding respective pulse sequences for the plurality of pixels. The pulse sequence for a given pixel represents a space-time signal change at the given pixel.

904: Calculating, for each pixel of the plurality of pixels, a pixel value of the pixel according to the pulse sequence for the pixel.

906: Obtaining an image at the specified time according to a space arrangement of the pixels of the plurality of pixels, in accordance with the pixel values of the plurality of pixels at the specified time.

In an embodiment, the image may be a color image or a black and white image. The plurality of pixels may be directed to a plurality of pixel dots constituting a portion or the whole of an image. Each pixel of a plurality of pixels may be directed to each pixel dots of the plurality of pixel dots constituting a portion or the whole of an image. The specified time may be directed to a particular time at which an image is to be generated from the encoded information. The generation of the image can be much later than the acquiring and encoding of the pulse sequences, for example, after the encoded information having been stored in a storage for a time interval or having been transmitted via a communication link to a remoted device (which remote device then decodes the encoded information and generates the image from the decoded pulse sequences). The pulse sequence may be directed to a sequence formed along time by a series of pulses formed with regard to each pixel. The pulse sequence may be formed by collecting spatiotemporal signals of individual local spatial positions in a monitored region, and accumulating the spatiotemporal signals of the local spatial positions based on time to obtain a accumulative signal intensity value; transforming the accumulative signal intensity value by a filter, and outputting a pulse signal when the transformation result exceeds a certain threshold; arranging the pulse signals corresponding to the local spatial positions in a sequence in a chronological order to obtain a pulse sequence representing the local spatial position signal and its change.

In an embodiment, obtaining from encoded information a pulse sequence in a unit time period before the specified time, with regard to each pixel of a plurality of pixels, may be directed to, when each pulse sequence corresponds to one pixel, decoding the encoded information to obtain a sequence of one or more pulses arranged along time, the one or more pulses being formed in the unit time period of a particular length before the specified time. In an embodiment, calculating a pixel value of the pixel according to the pulse sequence may be directed to calculating a pixel value of a pixel according to pulse distribution in a pulse sequence, such as the gap between adjacent pulses, the number of pulses in a fixed time interval, and the like. In an embodiment, generating an image at the specified time according to a space arrangement of the pixels, in accordance with pixel values of the plurality of pixels at the specified time, may be directed to performing the same calculating and processing with regard to each of the pixels to obtain a pixel value shown by each pixel of the plurality of pixels of the imaging device at the specified time, and display the corresponding pixel value at respective position according to the position of each pixel in relation to all the pixels of the imaging device, so as to constitute the whole image.

In an embodiment, calculating a pixel value of the pixel according to the pulse sequence includes: calculating a quantity of pulses in a fixed period of time before the specified time; obtaining the pixel value according to the quantity of pulses.

In an embodiment, calculating a quantity of pulses in a fixed period of time before the specified time may be directed to analyzing the pulse sequence, finding an time in the time duration represented by the pulse sequence, extracting a fixed segment of time period before the time (the time is, in turn, prior to the specified time), and counting the number of pulses in the fixed segment of time period. In an embodiment, obtaining the pixel value according to the quantity of pulses may be directed to taking the number of pulses as a parameter, performing a particular calculating to obtain the pixel value.

In an embodiment, calculating a pixel value of the pixel according to the pulse sequence includes: acquiring a length of a time interval between adjacent pulses in the pulse sequence, calculating an intensity value corresponding to the time interval according to the length of the time interval, and obtaining a first accumulated pixel value according to one or more intensity values. Generating an image at the specified time according to a space arrangement of the pixels, in accordance with pixel values of the plurality of pixels at the specified time includes: generating the image at the specified time according to the first accumulated pixel value at a pixel position corresponding to each pixel of the plurality of pixels.

In an embodiment, acquiring a length of a time interval between adjacent pulses in the pulse sequence may be directed to analyzing the pulse sequence, finding one or more pairs of adjacent pulses (no other pulse exists between adjacent pulses), and computing the length of time represented by the time interval between adjacent pulses. The intensity value may be directed to a value for representing the concentration degree of pulses. In some embodiment, the intensity value may be interpreted to be a pixel value as an intermediate result of calculating or processing, which is not necessarily the pixel value as finally shown. In an embodiment, calculating an intensity value corresponding to the time interval according to the length of the time interval may be directed to taking the length of the time interval as a parameter, substituting the parameter in a corresponding formulation to figure out the intensity value. In an embodiment, obtaining a first accumulated pixel value according to one or more intensity values may be directed to obtaining one or more intensity values with regard to one or more pairs of adjacent pulses; and performing a calculation based on the one or more intensity values, such as accumulating these intensity values, or substituting these intensity values as parameters in a formulation, to obtain the first accumulated pixel value. In an embodiment, generating the image at the specified time according to the first accumulated pixel value at a pixel position corresponding to each pixel of the plurality of pixels may be directed to performing calculation with regard to each pixel of the imaging device to obtain a corresponding first accumulated pixel value; and displaying according to the result of calculation with regard to all the pixels to obtain the image.

In an embodiment, acquiring a length of a time interval between adjacent pulses in the pulse sequence, calculating an intensity value corresponding to the time interval according to the length of the time interval, and obtaining a first accumulated pixel value according to one or more intensity values includes: accumulating at least one intensity value before the specified time to obtain the first accumulating pixel value.

In an embodiment, accumulating at least one intensity value before the specified time to obtain the first accumulating pixel value may be directed to performing calculation with regard to one or more pairs of adjacent pulses before the specified time to obtain at least one intensity value; and accumulating the at least one intensity value to obtain the first accumulated pixel value according to the accumulating result.

In an embodiment, generating an image at the specified time according to a space arrangement of the pixels, in accordance with pixel values of the plurality of pixels at the specified time includes: setting a first specific amount corresponding to the specified time of the pixel position, and summing the first specific amount and the first accumulated pixel value to obtain a first pixel value of the pixel position; and generating the image at the specified time according to the first specific amount at pixel positions corresponding to the plurality of pixels.

In an embodiment, generating an image at the specified time according to a space arrangement of the pixels, in accordance with pixel values of the plurality of pixels at the specified time includes: comparing the first pixel value with a pixel threshold range, and obtaining a second specific amount by adjusting the first specific amount; summing the first accumulated pixel value and the second specific amount to obtain a second pixel value of the pixel position; and generating the image at the specified time according to the second pixel value at pixel positions corresponding to the plurality of pixels.

In an embodiment, the imaging method further includes: determining an accumulated time duration before the specified time. Acquiring a length of a time interval between adjacent pulses in the pulse sequence, calculating an intensity value corresponding to the time interval according to the length of the time interval, and obtaining a first accumulated pixel value according to one or more intensity values, includes: acquiring at least one intensity value corresponding to at least one time interval during the accumulated time duration; calculating at least one attenuation value of the at least one intensity value after it is attenuated when reaching the specified time; summing the at least one attenuation value to obtain the first accumulated pixel value.

In an embodiment, determining an accumulated time duration before the specified time may be directed to analyzing the pulse sequence, finding an time from the time duration represented by the pulse sequence, and extracting a fixed segment of time period before the time as the accumulated time duration. In an embodiment, acquiring at least one intensity value corresponding to at least one time interval during the accumulated time duration may be directed to finding at least one pair of adjacent pulses in the accumulated time duration from the pulse sequence, and obtaining at least one intensity value according to the time interval between the two pulses of the at least one pair of adjacent pulses. In an embodiment, calculating at least one attenuation value of the at least one intensity value after it is attenuated when reaching the specified time may be directed to calculating the intensity value according to the adjacent pulses at early times, and calculating the attenuation value of the intensity value according to the length of time gap between the adjacent pulses and the specified time. In an embodiment, the imaging method further includes: setting the first accumulated pixel value at 0 if there is no fired pulse in the accumulated time duration.

In an embodiment, an input pulse signal at the pixel position can change first accumulated pixel values or first specific amounts at one or more other pixel positions.

In an embodiment, a first pixel value at the pixel position can change second specific amounts or pixel values at one or more other pixel positions.

In an embodiment, a pulse signal-based display method is provided. The method includes:
- analyzing a pulse sequence corresponding to a single pixel position to obtain pulse-firing information of the pulse sequence, the pulse-firing information including multiple pulse-firing times,
- acquiring pixel values corresponding to multiple pulse-firing times before a single pulse-firing time, and accumulating the pixel values as a first accumulated pixel value;
- setting a first specific amount corresponding to the single pulse-firing time of the pixel position, and summing the first specific amount and the first accumulated pixel value to obtain a first pixel value of the pixel position;
- comparing the first pixel value with a pixel threshold range, and obtaining a second specific amount by adjusting the first specific amount; and
- obtaining a second pixel value of the pixel position by summing the first accumulated pixel value and the second specific amount.

The acquiring a first accumulated pixel value of pixel values corresponding to multiple pulse-firing times before a single pulse-firing time includes:
- determining an accumulated time duration before the single pulse-firing time;
- acquiring respective pixel values corresponding to the pulse-firing times during the accumulated time duration;
- calculating respective attenuation values of the pixel values after they are attenuated when reaching the single pulse-firing time; and
- obtaining the first accumulated pixel value by summing the attenuation values.

The acquiring respective pixel values corresponding to the pulse-firing times during the accumulated time duration includes:
setting the first accumulated pixel value at 0 if there is no pulse-firing time in the accumulated time duration.

For a pixel at each position, if a pulse occurs at a current time instant t0, the pixel value I(t0) of the pixel at the current time instant changes as follows:

$$I(t_0) = I(t_0) + \frac{\Delta}{\tau}\exp\left(1 - \frac{\Delta}{\tau}\right)$$

where I(t0) is an initial value (first pixel value) of the pixel, $\Delta$ is a delay factor, $\tau$ is a model parameter, and exp is an exponential function with a natural constant e being the base.

In a case where the pixel value is superimposed at the time instant when the pulse occurs, a superimposition amount is gradually attenuated over time, and the pixel value at a time instant t (t>t0) is:

$$I(t) = I(t_0) + \frac{t - t_0 - \Delta}{\tau}\exp\left(1 - \frac{t - t_0 - \Delta}{\tau}\right)$$

where I(t) is a value of the first pixel value after being attenuated at the time instant t, and the upper and lower limits of the pixel value and the attenuating rate can be adjusted by adjusting the model parameter T and the attenuating factor T.

The comparing the first pixel value with a pixel threshold range, and obtaining a second specific amount by adjusting the first specific amount, includes:
the adjusting the value of the first specific amount includes: increasing or decreasing the value of the first specific amount, to make a value obtained by superimposing the value of the first specific amount with the first accumulated pixel value be within the pixel threshold range. By adjusting the value of the first specific amount, the resulting second specific amount can express more information as compared to the values of second specific amounts of all spatial pixels.

The pixel threshold range includes: a fixed value set as the pixel threshold range, and/or a pixel threshold range determined based on normalized global pixel values, and/or a pixel threshold range determined based on an ideal dynamic range of image. Each pixel has a relatively independent pixel threshold range.

The determining the pixel threshold range based on normalized global pixel values includes: based on pulse firing conditions of pixel positions at the same time instant and based on first pixels, judging whether most of the first pixel values at the time instant is too small or too large; if yes, normalizing the first pixel values based on the global pixel value to determine a pixel threshold range. In this way, the generated image is prevented from being too bright or too dark, which will cause unclear displayed content.

If the first pixel value is out of the pixel threshold range but is very close to the pixel threshold range, the pixel threshold range is changed to include the first pixel value.

The setting the first specific amount includes setting the first specific amount as a fixed value. The fixed value includes a function which is attenuated over time.

The first specific amount is 0 when there is no pulse to fire.

The first specific amount can also be dynamically adjusted based on the accumulated time duration before the single pulse-firing time. In a case where multiple dense pulse firings occur in the accumulated time duration before the single pulse-firing time, the value of the first specific amount is dynamically reduced.

The pixel values are obtained based on a function in which the pixel values are attenuated with the pulse-firing time, including: attenuated at a fixed ratio, attenuated at a fixed magnitude, and/or attenuated by being decreased with a decreasing part of the function.

The function includes the Gaussian function, the Exponential function and the Logarithmic function, or includes a biological neuron model.

After obtaining the second pixel value of the pixel position by summing the first accumulated pixel value and the adjusted first specific amount, the method further includes:

filtering the second pixel value based on a temporal neighbor relationship of the pixel values at the single pixel position.

The method includes generating an image by using first accumulated/first/second pixel values of all pixel positions at the same pulse-firing time.

The generating an image by using first accumulated/first/second pixel values of all pixel positions at the same pulse-firing time includes:

directly restoring an image by using the first accumulated/first/second pixel values of all pixel positions at the same pulse-firing time, and/or forming an image after the first accumulated/first/second pixel values are filtered, based on a spatial neighbor relationship of all pixel positions, and/or forming an image after the first accumulated/first/second pixel values are filtered, based on a spatiotemporal neighbor relationship of all pixel positions.

For generating an image by using the pixel values, a good effect is achieved when the image is generated by using the second pixel values.

Displaying a pulse signal of a certain pixel position at a certain time instant in the pulse data is taken as an example, and it is assumed that the certain time instant is t, and the certain pixel position is the position of a pixel P.

Figure 10:
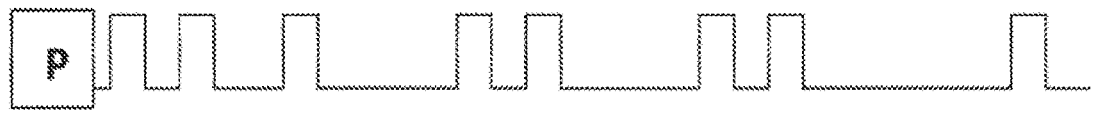
FIG. 10 is a schematic diagram showing pixels and a pulse sequence of an imaging method according to an embodiment of the present disclosure.

A pulse sequence corresponding to the position of the pixel P is analyzed to obtain pulse-firing information of the pulse sequence, and the pulse-firing information includes multiple pulse-firing times. FIG. 10 is a pulse sequence corresponding to the position of the pixel P.

A first accumulated pixel value of pixel values corresponding to multiple pulse-firing times before the time instant t is acquired.

Figure 11:
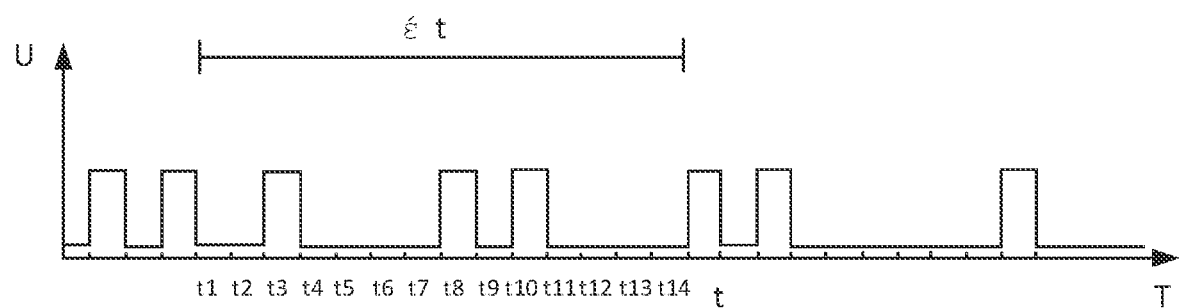
FIG. 11 is a schematic diagram showing a pulse sequence of an imaging method according to an embodiment of the present disclosure.

FIG. 11 shows the pulse sequence of the position P.

A historical time before the time instant t is determined based on the pulse-firing information. It is assumed that Δt is an accumulated time duration before the time instant t.

Pixel values corresponding to pulse-firing times in the accumulated time duration (Δt) are acquired. Attenuation values of the pixel values after they are attenuated when reaching the single pulse-firing time (the time instant t) are calculated.

The attenuation values are summed to obtain a first accumulated pixel value. As shown in FIG. 11, there are totally 14 accumulated time instants in the time duration Δt before the time instant t, which are set as time instants t1 to t14 respectively. Attenuation values of the pixel values after they are attenuated when reaching the single pulse-firing time are calculated. There are pulses firing at the time instant t3, time instant t8 and time instant t10 respectively. It is assumed that the pulse at the time instant t3 is an accumulated first pulse, the pulse at the time instant t8 is an accumulated second pulse and the pulse at the time instant t10 is an accumulated third pulse.

A specific amount is added at the time instant t3, time instant t8 and time instant t10 respectively. A value of each specific amount at each of the above time instants after it is attenuated when reaching the time instant t is calculated, and pixel values of the three accumulated time instants after attenuation are obtained. The three pixel values after attenuation are summed to obtain a first accumulated pixel value.

The first accumulated pixel value is 0 if there is no pulse fired during the time duration Δ t.

A first specific amount corresponding to the single pulse-firing time (the time instant t) of the position P of the pixel is set, and the first specific amount and the first accumulated pixel value are summed to obtain a first pixel value of the position P of the pixel.

The first pixel value is compared with the pixel threshold range, and the first specific amount is adjusted. The pixel threshold range of the pixel P is calculated by setting the pixel threshold range and/or determining the pixel threshold range based on normalized global pixel values and/or determining the pixel threshold range based on an ideal dynamic range of image. Based on the pixel threshold range corresponding to the position P of the pixel, whether the first pixel value is within the range is judged. The value of the first specific amount is adjusted, and a second specific amount is obtained.

The first accumulated pixel value of the position P of the pixel and the second specific amount are summed to obtain a second pixel value of the position P of the pixel.

The second pixel value of the position P of the pixel may be filtered based on a temporal neighbor relationship as required. That is, second pixel values of respective accumulated time instants of the position P of the pixel before the time instant t are calculated based on a temporal neighbor relationship of pixel values at the position P of the pixel. Then, a curve of the second pixel values corresponding to the respective accumulated time instants is obtained. The second pixel values at the time instant t are filtered based on the curve to obtain the filtered second pixel values.

The filtering based on the temporal neighbor relationship includes: filtering second pixel values of all global pixel positions based on the temporal neighbor relationship, or only filtering second pixel values of some pixel positions based on the temporal neighbor relationship.

Second pixel values of all pixel positions at the time instant t are calculated using the above method, and an image at the time instant t is formed using the second pixel values of all the pixel positions.

The forming an image at the time instant t using the second pixel values of all the pixel positions includes:

directly restoring an image by using the second pixel values of all pixel positions at the same pulse-firing time, and/or forming an image after the second pixel values are filtered, based on a spatial neighbor relationship of all pixel positions, and/or forming an image after the second pixel values are filtered, based on a spatiotemporal neighbor relationship of all pixel positions.

Figure 12:
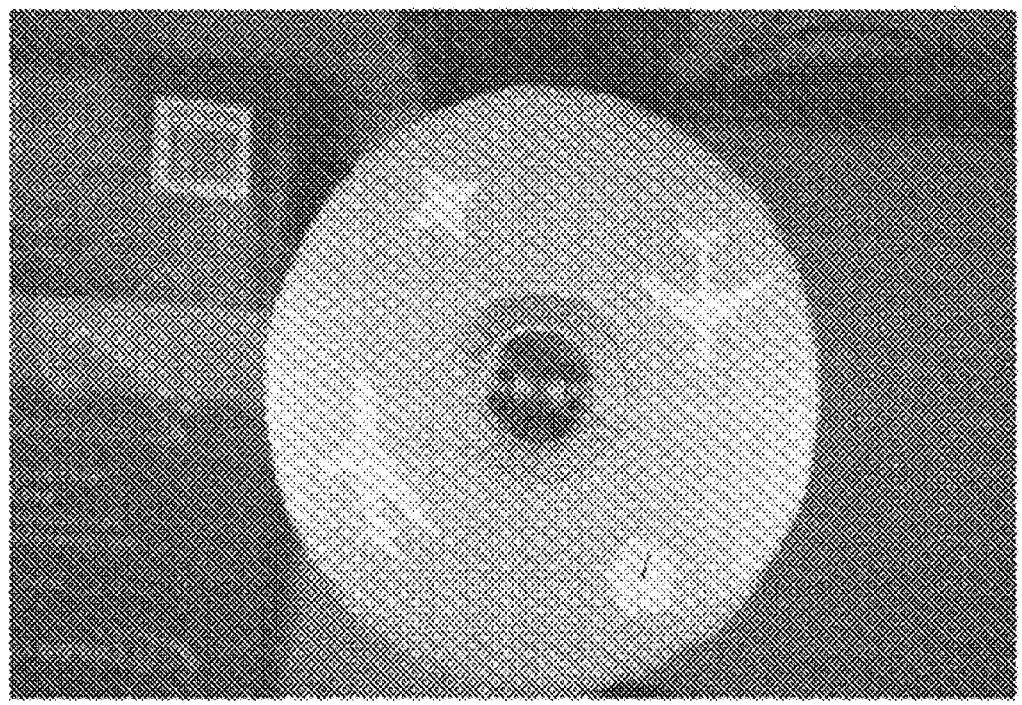
FIG. 12 is a schematic diagram showing an output image of an imaging method according to an embodiment of the present disclosure.

FIG. 12 is a clear image on a rotary disc rotating at high speed, which is restored (generated) using pulse data.

In the pulse signal-based display method according to the present disclosure, pulse-firing information of pulse sequences is obtained by analyzing pulse data. Pixel values are calculated based on the pulse-firing information. Pulse signals can be visually displayed based on a biological neuron pulse-firing mechanism. In this way, the time domain characteristic of the pulse signal is effectively utilized, an image with high quality is formed and an image at any continuous time instant is output. Firing information (firing frequency) in the pulse signal is calculated and a statistic can be made. Pixel values during an accumulated time duration of pixel positions and a global pixel value of the entire image is calculated, thereby determining a pixel threshold range of each pixel position. In this way, pixel thresholds can be respectively set for pixels at the pixel positions based on temporal and spatial relationships, so that the pixel thresholds of the respective pixel positions are relatively independent, thereby effectively improving the quality of an output image. In a case where a difference between the first pixel and the pixel threshold range is small, the pixel threshold range is adjusted to include the first pixel value, which is advantageous for quality improvement of finally generated image. An unclearness caused by over-bright image or over-dark image can be reduced by adjusting the pixel values of the finally generated image based on the pixel threshold range. By calculating the pixel values in the accumulated time durations of the pixel positions and dynamically adjusting the first specific amount, the processing on the pixels in subsequent steps can be facilitated. The method is applicable to data in various pulse forms, including the generation of color images. The generated image can be used as a data source for machine learning algorithms and other image and video recognition algorithms.

Those of ordinary skill in the art may understand that all or some of the steps for implementing the above method embodiments may be completed through a program that instructs related hardware. The program may be stored in a computer-readable storage medium. When the program is executed, the steps including the above method embodiments are performed. The above storage medium includes: various media such as a ROM, a RAM, a magnetic disk, and an optical disk that can store program code.

Additionally, embodiments of the present disclosure further provide a computing device including:

a memory for storing a computer program; and
a processor for executing the computer program stored in the memory, where when the computer program is executed, the encoding method for a pulse signal according to any one of the above embodiments of the present disclosure is implemented.

In some embodiments, the computing device in the embodiments of the present disclosure may, for example, include, but are not limited to, any of: an integrated circuit, a sensor, etc.

In some other possible implementations, the computing device in the embodiments of the present disclosure may, for example, include, but are not limited to, any of: a camera, a webcam, an audio/video player, a navigation device, a fixed-position terminal, an entertainment device, a smart phone, a communication device, a mobile device, a vehicle or facility, an industrial device, a medical device, a security device, a flight device, a household appliance, etc.

Figure 13:
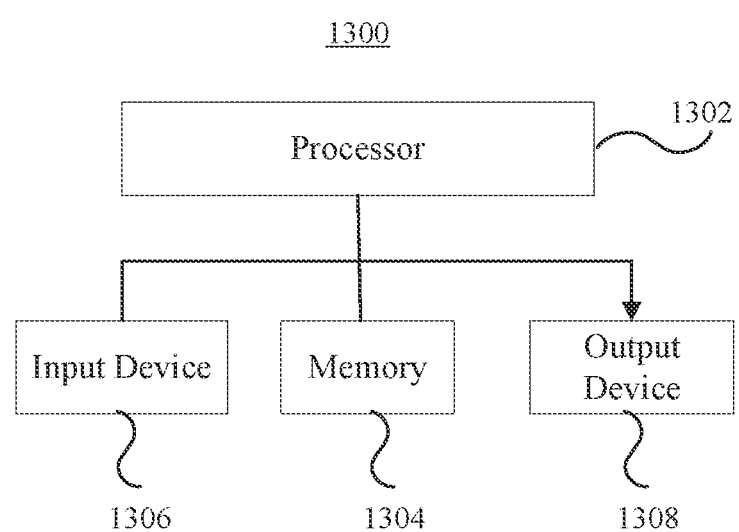
FIG. 13 is a schematic diagram of a computing device according to an embodiment of the present disclosure.

FIG. 13 is a schematic diagram of a computing device 1300 according to an embodiment of the present disclosure. The computing device 1300 according to an embodiment of the present disclosure is described below with reference to FIG. 13. The computing device may be either or both of a first device and a second device, or a stand-alone device independent thereof, which may communicate with the first device and the second device to receive the collected input signals therefrom.

As shown in FIG. 13, the computing device includes one or more processors 1302 and a memory 1304.

The processor 1302 may be a central processing unit (CPU) or other form of processing unit with data processing capabilities and/or instruction execution capabilities, and may control other components in the computing device to perform desired functions.

The memory 1304 may store one or more computer program products. The memory 1304 may include various forms of computer-readable storage media, for example, a volatile memory 1304 and/or a non-volatile memory 1304. The volatile memory 1304 may include, for example, a random access memory (RAM) 1304 and/or a cache 1304. The non-volatile memory 1304 may include, for example, a read-only memory (ROM) 1304, a hard disk, or a flash memory. One or more computer program products may be stored on the computer-readable storage medium, and may be executed by the processor 1302 to implement the encoding methods for a pulse signal in various embodiments of the present disclosure described above and/or other desired functions.

In one example, the electronic apparatus may further include: an input device 1306 and an output device 1308, which are interconnected via a bus system and/or other forms of connection mechanism (not shown).

In addition, the input device 1306 may further include, for example, a keyboard, a mouse, etc.

The output device 1308 may externally output various types of information, including the determined distance information, direction information, etc. The output device 1308 may include, for example, a display, a speaker, a printer, a communication network and a remote output device 1308 connected thereto, etc.

Of course, for the sake of simplicity, only some of the components in the computing device that are related to the embodiment of the present disclosure are shown in FIG. 13, and components such as buses and input/output interfaces are omitted. In addition, the computing device may include any other suitable components depending on the particular application.

Furthermore, an embodiment of the present disclosure may also be a computer-readable storage medium having computer program instructions stored thereon that, when executed by the processor 1302, cause the processor 1302 to perform steps, which are described in the preceding parts of this specification, in the encoding methods for a pulse signal according to various embodiments of the present disclosure.

The computer-readable storage medium may be any combination of one or more readable media. The readable medium may be a readable signal medium or a readable storage medium. An example of the readable storage medium may include but is not limited to electric, magnetic, optical, electromagnetic, infrared, or semiconductor systems, apparatuses or devices, or any combination thereof. More specific examples of the readable storage medium (a non-exhaustive list) include: an electrical connection having one or more wires, a portable disk, a hard disk, a random access memory (RAM) 1304, a read-only memory (ROM) 1304, an erasable programmable read-only memory (EPROM or flash memory) 1304, an optical fiber, a portable compact disk read-only memory (CD-ROM) 1304, an optical memory 1304, a magnetic memory 1304, or any suitable combination of the above.

While the general principles of the present disclosure have been described above in connection with specific embodiments, it is to be rioted that the advantages, strengths, and effects set forth in the present disclosure are merely examples and are not to be considered as limiting, and these advantages, strengths, and effects are not to be regarded as necessary for all embodiments of the present disclosure. In addition, the specific details disclosed above are only examples and for ease of understanding, rather than limitations, and the details described above do not limit the present disclosure to use the specific details described above for implementation.

The embodiments in this specification are described in a progressive manner. Each embodiment focuses on the differences from other embodiments, and for the same or similar parts among the various embodiments, reference can be made to each other. The system embodiment basically corresponds to the method embodiment and therefore is described in a relative simple manner, and for related parts, reference can be made to part of the description of the method embodiment.

The block diagrams of devices, apparatuses, equipments, and systems involved in the present disclosure are merely illustrative examples and are not intended to require or imply that connection, arrangement, and configuration must be implemented in the manner shown in the block diagrams. The devices, apparatuses, equipment, and systems may be connected, arranged, and configured in any manner, as will be understood by those skilled in the art. Words such as "including", "containing", and "having" are open-ended terms that mean "including, but not limited to" with which the words can be used interchangeably. The words "or" and "and" used herein refer to the word "and/or" with which the words can be used interchangeably unless the context clearly indicates otherwise. The word "such as" used herein refers to the phrase "such as but not limited to" with which the word can be used interchangeably.

The method and apparatus of the present disclosure may be implemented in many ways. For example, the method and apparatus of the present disclosure may be implemented by means of software, hardware, firmware, or any combination of software, hardware, and firmware. The above sequence of steps for the method is merely for illustration, and the steps of the method of the present disclosure are not limited to the sequence specifically described above unless otherwise specifically stated. In addition, in some embodiments, the present disclosure may also be implemented as programs recorded in a recording medium, the programs including machine-readable instructions for implementing the method according to the present disclosure. Therefore, the present disclosure also covers the recording medium storing the programs for implementing the method according to the present disclosure.

While the present disclosure has been illustrated and described in detail in the drawings and foregoing description, the present disclosure is not limited to the disclosed embodiments. By studying the accompanying drawings, the disclosure, and the appended claims, those skilled in the art can understand and implement modifications to the disclosed embodiments when practicing the claimed subject matter. The mere fact that certain measures are recited in mutually different dependent claims does not indicate that a combination of these measures cannot be used to get benefit.

What is claimed is:

1. A method, comprising:
   obtaining, from encoded information, a pulse sequence for each pixel in a plurality of pixels in a unit time period before a specified time, wherein the encoded information is obtained by encoding respective pulse sequences for the plurality of pixels, wherein the pulse sequence for a given pixel of the plurality of pixels represents a space-time signal change at the given pixel;
   calculating, for each pixel of the plurality of pixels, a pixel value of the pixel according to the pulse sequence for the pixel; and
   obtaining an image at the specified time according to a space arrangement of the pixels of the plurality of pixels, in accordance with the pixel values of the plurality of pixels at the specified time.

2. The method according to claim 1, wherein the pulse sequence for the given pixel comprises a pulse eigenvalue indicating whether a respective pulse signal is generated for the given pixel at each instant, and wherein the encoding respective pulse sequences for the plurality of pixels comprises:
   for any pulse sequence of the respective pulse sequences:
      in response to an end of each unit time period, sampling the pulse sequence in the unit time period at a sampling frequency to obtain pulse eigenvalues corresponding to respective sampling instants in the unit time period; and
      encoding the pulse eigenvalues corresponding to respective sampling instants in the unit time period to obtain the encoded information corresponding to the unit time period.

3. The method according to claim 2, wherein the sampling frequency is $2^k$ Hertz, k being an integer greater than or equal to 0, and wherein the encoding the pulse eigenvalues corresponding to respective sampling instants in the unit time period to obtain the encoded information corresponding to the unit time period comprises:
   encoding the pulse eigenvalues corresponding to respective sampling instants in the unit time period into $2^k$ bits of data to obtain the encoded information corresponding to the unit time period.

4. The method according to claim 3, further comprising:
   determining or adjusting the sampling frequency based on a size of a local storage space, a data volume, and an output frequency of the encoded information; or
   determining or adjusting the sampling frequency based on a size of the local storage space, a bitrate, and a transmission bandwidth of the encoded information; or
   determining or adjusting the sampling frequency according to requirements of an observation scenario.

5. The method according to claim 2, further comprising:
   estimating a bitrate of the encoded information corresponding to the unit time period based on the encoded information corresponding to the unit time period.

6. The method according to claim 2, further comprising:
   obtaining light intensity values of a spatial region at respective sampling instants in the unit time period based on the pulse eigenvalues corresponding to the respective sampling instants; and
   detecting a target in an scenario based on the light intensity values of one or more spatial regions in the scenario at the respective sampling instants.

7. The method according to claim 1, wherein the pulse sequence for the given pixel comprises a pulse eigenvalue indicating whether a respective pulse signal is generated for the given pixel at each instant, and wherein the encoding respective pulse sequences for the plurality of pixels comprises:
   for any pulse sequence of the respective pulse sequences:
      sampling the pulse sequence at a sampling frequency to obtain pulse eigenvalues corresponding to respective sampling instants;
      in response to an end of each unit time period, determining data to be encoded in the unit time period based on a current encoding mode and the pulse eigenvalues corresponding to respective sampling instants in the unit time period, wherein the unit time period is determined based on a data frame output frequency; and
      encoding, based on the current encoding mode, the data to be encoded in the unit time period to obtain the encoded information corresponding to the unit time period.

8. The method according to claim 7, wherein the sampling frequency is $2^n$ Hertz, n being an integer greater than or equal to 1, and wherein the data frame output frequency is $2^m$ Hertz, m being an integer greater than or equal to 0, and m being less than n.

9. The method according to claim 7, further comprising:
obtaining the current encoding mode, wherein the current encoding mode comprises at least one of a pulse number encoding mode, an instantaneous pulse encoding mode, or a strongest pulse encoding mode.

10. The method according to claim 9, wherein depending on the current encoding mode, the determining data to be encoded in the unit time period based on a current encoding mode and the pulse eigenvalues corresponding to respective sampling instants in the unit time period comprises:
when the current encoding mode is the pulse number encoding mode, determining, based on the pulse eigenvalues corresponding to respective sampling instants in the unit time period, a quantity of pulse signals generated in the unit time period as the data to be encoded in the unit time period, wherein the quantity of pulse signals generated in the unit time period is in a range of $2^{n-m}-1$; or
when the current encoding mode is the instantaneous pulse encoding mode, determining, based on the pulse eigenvalues corresponding to respective sampling instants in the unit time period, a pulse width of a pulse signal generated in the unit time period and being closest to a current instant as the data to be encoded in the unit time period; or
when the current encoding mode is the strongest pulse encoding mode, determining, based on the pulse eigenvalues corresponding to respective sampling instants in the unit time period, a shortest pulse width among pulse widths of pulse signals generated in the unit time period as the data to be encoded in the unit time period.

11. The method according to claim 9, wherein the obtaining the current encoding mode comprises:
obtaining, as the current encoding mode, an encoding mode corresponding to preset encoding mode information; or
determining, as the current encoding mode, an encoding mode corresponding to received encoding mode information; or
selecting, as the current encoding mode, an encoding mode from preset encoding mode information; or
obtaining, as the current encoding mode, an encoding mode corresponding to a current application scenario.

12. The method according to claim 7, further comprising:
determining a bitrate of the encoded information based on the sampling frequency, the data frame output frequency, and a bit depth of the encoded information.

13. The method according to claim 7, further comprising:
after obtaining the encoded information corresponding to the unit time period, determining light intensity values corresponding to the encoded information based on the current encoding mode and the encoded information corresponding to the unit time period.

14. The method according to claim 7, further comprising:
determining or adjusting the sampling frequency based on a size of a local storage space, a bit depth of the encoded information, and a quantity of imaging elements comprised in an apparatus for generating the pulse signals; or
determining or adjusting the data frame output frequency based on the size of the local storage space, a bitrate and a transmission bandwidth of the encoded information; or
determining or adjusting the sampling frequency based on requirements of a current scenario.

15. The method according to claim 1,
wherein the calculating a pixel value of the pixel according to the pulse sequence for the pixel comprises:
acquiring a length of a time interval between adjacent pulses in the pulse sequence, calculating an intensity value corresponding to the time interval according to the length of the time interval, and obtaining a first accumulated pixel value according to one or more intensity values; and
wherein the obtaining an image at the specified time according to a space arrangement of the pixels, in accordance with pixel values of the plurality of pixels at the specified time comprises:
obtaining the image at the specified time according to the first accumulated pixel value at a pixel position corresponding to each pixel of the plurality of pixels.

16. The method according to claim 15, wherein the obtaining an image at the specified time according to a space arrangement of the pixels, in accordance with pixel values of the plurality of pixels at the specified time comprises:
setting a first specific amount corresponding to the specified time of the pixel position, and summing the first specific amount and the first accumulated pixel value to obtain a first pixel value of the pixel position; and
obtaining the image at the specified time according to the first specific amount at pixel positions corresponding to the plurality of pixels.

17. The method according to claim 16, wherein the obtaining an image at the specified time according to a space arrangement of the pixels, in accordance with pixel values of the plurality of pixels at the specified time comprises:
comparing the first pixel value with a pixel threshold range, and obtaining a second specific amount by adjusting the first specific amount;
summing the first accumulated pixel value and the second specific amount to obtain a second pixel value of the pixel position; and
obtaining the image at the specified time according to the second pixel value at pixel positions corresponding to the plurality of pixels.

18. The method according to claim 17, wherein the comparing the first pixel value with a pixel threshold range, and obtaining a second specific amount by adjusting the first specific amount comprises:
obtaining the second specific amount by adjusting the value of the first specific amount if the first pixel value is not within the pixel threshold range; and
determining the first specific amount as the second specific amount if the first pixel value is within the pixel threshold range.

19. A computing device, comprising:
at least one processor; and
at least one memory having instructions stored thereon, wherein the instructions, when executed by the at least one processor individually or collectively, cause the computing device to perform operations comprising:
obtaining, from encoded information, a pulse sequence for each pixel in a plurality of pixels in a unit time period before a specified time, wherein the encoded information is obtained by encoding respective pulse sequences for the plurality of pixels, wherein the pulse sequence for a given pixel of the plurality of pixels represents a space-time signal change at the given pixel;
calculating, for each pixel of the plurality of pixels, a pixel value of the pixel according to the pulse sequence for the pixel; and obtaining an image at the specified time according to a space arrangement of the pixels of the plurality of pixels, in accordance with the pixel values of the plurality of pixels at the specified time.

20. A non-transitory computer-readable medium comprising instructions, wherein the instructions, when executed by at least one processor of a computing device individually or collectively, cause the computing device to perform operations comprising:
- obtaining, from encoded information, a pulse sequence for each pixel in a plurality of pixels in a unit time period before a specified time, wherein the encoded information is obtained by encoding respective pulse sequences for the plurality of pixels, wherein the pulse sequence for a given pixel of the plurality of pixels represents a space-time signal change at the given pixel;
- calculating, for each pixel of the plurality of pixels, a pixel value of the pixel according to the pulse sequence for the pixel; and
- obtaining an image at the specified time according to a space arrangement of the pixels of the plurality of pixels, in accordance with the pixel values of the plurality of pixels at the specified time.

\* \* \* \* \*

UNITED STATES PATENT AND TRADEMARK OFFICE
CERTIFICATE OF CORRECTION

| | |
|---|---|
| PATENT NO. | : 12,452,416 B2 |
| APPLICATION NO. | : 18/371213 |
| DATED | : October 21, 2025 |
| INVENTOR(S) | : Tiejun Huang |

It is certified that error appears in the above-identified patent and that said Letters Patent is hereby corrected as shown below:

In the Claims

Claim 10: Column 45, Line 19: "$2^{n-m} - 1$; or" should read as -- $[0, 2^{n-m} - 1]$; or --.

Signed and Sealed this
Second Day of December, 2025

John A. Squires
*Director of the United States Patent and Trademark Office*